United States Patent [19]
Ichihashi et al.

[11] Patent Number: 5,919,397
[45] Date of Patent: Jul. 6, 1999

[54] FERROELECTRIC LIQUID CRYSTAL COMPOSITION

[75] Inventors: Mitsuyoshi Ichihashi; Kanetsugu Terashima; Makoto Kikuchi; Fusayuki Takeshita, all of Chibaken; Kenji Furakawa, Yokosukashi, all of Japan

[73] Assignee: Chisso Corporation, Osaka, Japan

[21] Appl. No.: 08/850,866

[22] Filed: May 2, 1997

Related U.S. Application Data

[63] Continuation of application No. 08/572,349, Dec. 14, 1995, abandoned, which is a continuation of application No. 08/418,887, Apr. 7, 1995, abandoned, which is a continuation of application No. 08/255,883, Jun. 7, 1994, abandoned, which is a continuation of application No. 07/888,304, May 27, 1992, abandoned, which is a continuation of application No. 07/742,588, Aug. 7, 1991, abandoned, which is a continuation of application No. 07/312,930, Feb. 21, 1989, abandoned.

[30]     Foreign Application Priority Data

Feb. 22, 1988   [JP]   Japan .................................. 63-39286

[51] Int. Cl.$^6$ ............................ C09K 19/12; C09K 19/52
[52] U.S. Cl. ............................... 252/299.65; 252/299.01; 252/299.66
[58] Field of Search ..................... 252/299.65, 299.66, 252/299.01

[56]         References Cited

U.S. PATENT DOCUMENTS

| | | | |
|---|---|---|---|
| 4,668,427 | 5/1987 | Saito et al. ......................... | 252/299.63 |
| 4,725,688 | 2/1988 | Taguchi et al. ..................... | 544/298 |
| 4,728,458 | 3/1988 | Higuchi et al. ..................... | 252/299.65 |
| 4,732,699 | 3/1988 | Higuchi et al. ..................... | 252/299.66 |
| 4,737,313 | 4/1988 | Saito et al. ......................... | 252/299.63 |
| 4,759,869 | 7/1988 | Ohno ................................. | 252/299.67 |
| 4,769,176 | 9/1988 | Bradshaw .......................... | 252/299.65 |
| 4,780,242 | 10/1998 | Miyazawa et al. ................ | 252/299.65 |
| 4,828,754 | 5/1989 | Takehara et al. .................. | 252/299.65 |
| 4,871,472 | 10/1989 | Krause .............................. | 252/299.65 |
| 4,911,863 | 3/1990 | Sage et al. ......................... | 252/299.65 |

FOREIGN PATENT DOCUMENTS

| | | |
|---|---|---|
| 0197677 | 10/1986 | European Pat. Off. . |
| 0422613 | 4/1991 | European Pat. Off. . |

OTHER PUBLICATIONS

Furukawa et al., "Chiral Smectic C Liquid Crystals Having an Electronegative Substituent Ortho to the Chiral Tail Group–A Study of a Factor Determining the Magnitude of Spontaneous Polarization", Ferroelectrics, vol. 85 (1988), pp. 451–459.

Johno et al., "Smectic Layer Switching by an Electric Field in Ferroelectric Liquid Crystal Cells", Japanese Journal of Applied Physics, vol. 28, No. 1, (Jan. 1989), pp. L119–L120.

Chandani, et al. "Tristable Switching in Surface Stablilized Ferroelectric Liquid Crystals with a Large Spontaneous Polarization." *Japanese Journal of Applied Physics* vol. 27, No. 5 May, 1988 (pp. L729–L732).

*Primary Examiner*—C H Kelly
*Attorney, Agent, or Firm*—Leydig, Voit & Mayer, Ltd.

[57]             ABSTRACT

A ferroelectric liquid crystal composition exhibiting a novel chiral smectic phase is disclosed. In this novel phase, a director of liquid crystal molecules may settle in a third stable state which is distinguished from known bistable states of liquid crystal molecules in a ferroelectric chiral smectic C phase. By using this composition in a display element, a dichromatic display having a quick response can be provided on a third-colored display ground by applying a controlled electric field across the composition.

11 Claims, 4 Drawing Sheets

FERROELECTRIC LIQUID CRYSTAL COMPOSITION

This disclosure is a continuation of prior patent application Ser. No. 08/572,349, filed on Dec. 14, 1995, now abandoned which is a continuation of application Ser. No. 08/418,887, filed on Apr. 7, 1995, now abandoned, which is a continuation of application Ser. No. 08/255,883, filed Jun. 7, 1994, now abandoned, which is a continuation of application Ser. No. 07/888,304, filed May 27, 1992, now abandoned, which is a continuation of application Ser. No. 07/742,588, filed Aug. 7, 1991, now abandoned, which is a continuation of application Ser. No. 07/312,930, filed Feb. 21, 1989, now abandoned, entitled FERROELECTRIC LIQUID CRYSTAL COMPOSITION.

BACKGROUND OF THE INVENTION

The present invention relates to a ferroelectric liquid crystal composition and a liquid crystal display element employing the composition.

Practical liquid crystal display elements have chiefly employed nematic liquid crystals. These display elements have been applied to various kinds of display devices including watches, conventional electronic calculaters, and sophisticated display devices such as color televisions and other opto-electronic display devices. Although liquid crystal display devices have been developed, there has been unexpectedly limited scope for the application of these display elements because of their unsatisfactory electro-optic response. Various attempts and researches have been made to increase the response rate of the display device by means of improving liquid crystal materials, however, there is expected little room for improvement on the response properties by reducing viscosity of liquid crystal materials or by increasing dielectric anisotropy of the materials.

R. B. Meyer and others presented a liquid crystal display element having a large electro-optic response and employing a ferroelectric liquid crystal which has been very attractive. As a ferroelectric liquid crystal has spontaneous polarization (hereinafter abbreviated to Ps) liquid crystal molecules can easily be aligned under an electric field. Consequently, it becomes possible to drive the device at a large electro-optic response rate.

There still lie many problems to be solved before applying the ferroelectric liquid crystal to a practically usable display element. These problems include an inner structure of a liquid crystal cell, a method for aligning ferroelectric liquid crystals in a cell, a means to drive the liquid crystal element, and so forth. Streneous efforts have continuously been made by reseachers to solve those problems. Almost all of those researches have been carried out on a ferroelectric chiral smectic C phase (hereinafter abbreviated to SC* phase) and a surface stabilized ferroelectric liquid crystal mode (abbreviated to SSFLC mode). As the SSFLC mode makes use of bistable states of aligned molecules at SC* phase, the display device can exhibit only two domains which are bright and dark, respectively. In other words, it is difficult to exhibit gradation of image which is required in television display and the like. Thus, the application of the SSFLC mode at SC* phase is limited in scope considerably.

According to a twisted nematic mode (abbreviated to TN mode) at which the gradation of image is available, an electro-optic response is very small. Therefore, it may be present state of the art, heretofore, that there was no liquid crystal display having both a large electro-optic response and gradation of image together.

SUMMARY OF THE INVENTION

It is an object of the present invention to provide a ferroelectric liquid crystal composition which enables a display device having both a large electro-optic response and gradation of image.

A ferroelectric liquid crystal composition of this invention has been found by the present inventors to exhibit a novel ferroelectric liquid crystal phase that has never been reported. The inventors have named this novel mesophase as chiral smectic Y phase (hereinafter abbreviated to SY* phase).

As is described later, this SY* phase has a unique characteristic which other ferroelectric liquid crystal phases never have. Having made streneous efforts on research for application of this unique characteristic, the inventors have perfected the invention. The object of this invention is attained by (1) a ferroelectric chiral smectic Y liquid crystal composition comprising at least two members selected from the group consisting of the following chiral smectic Y liquid-crystalline compounds:

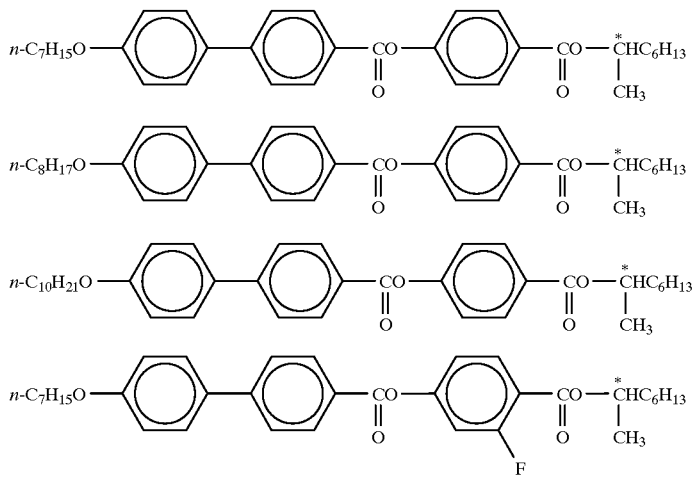

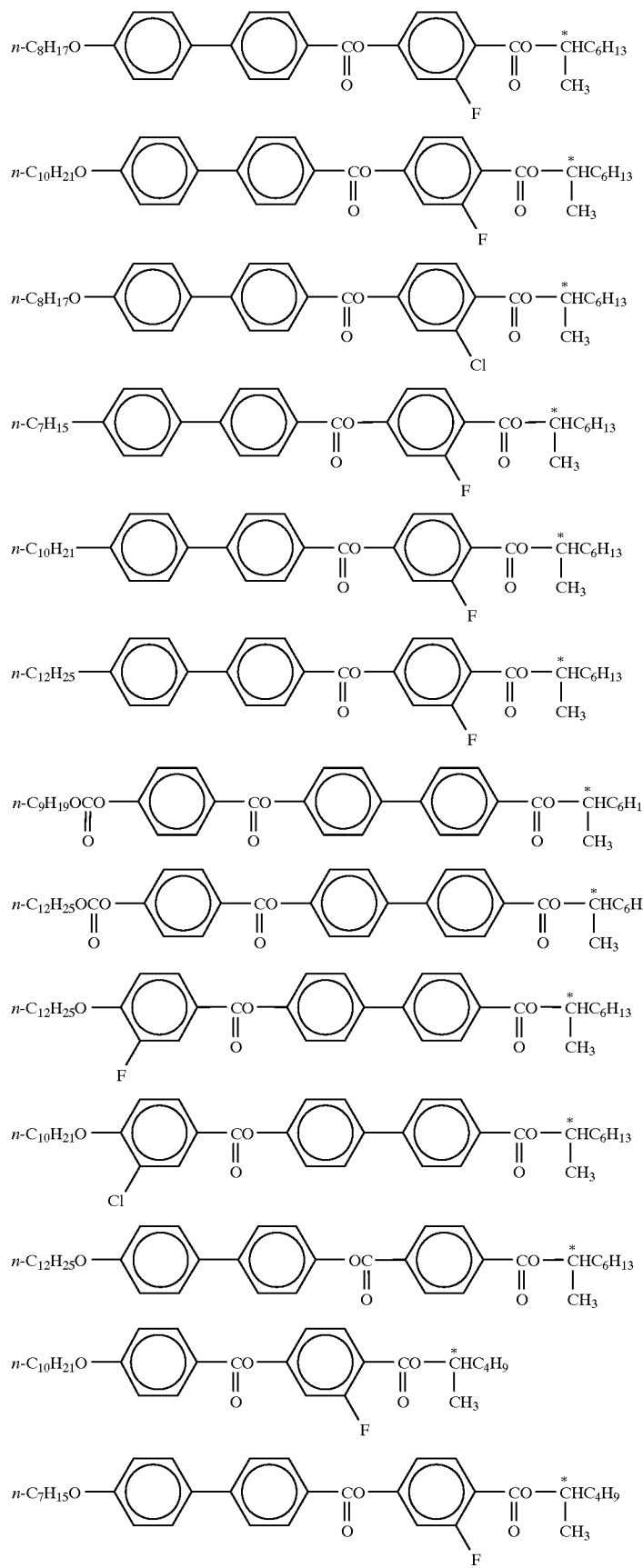

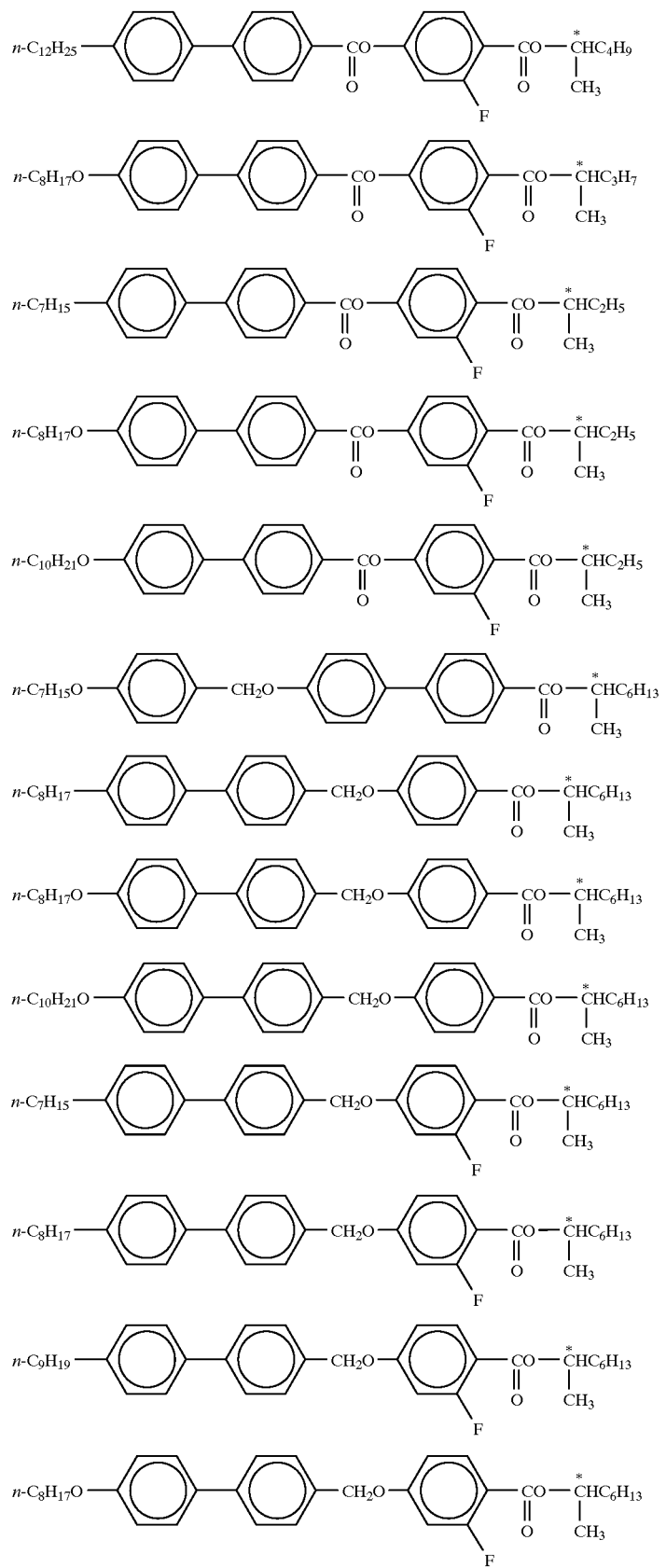

-continued
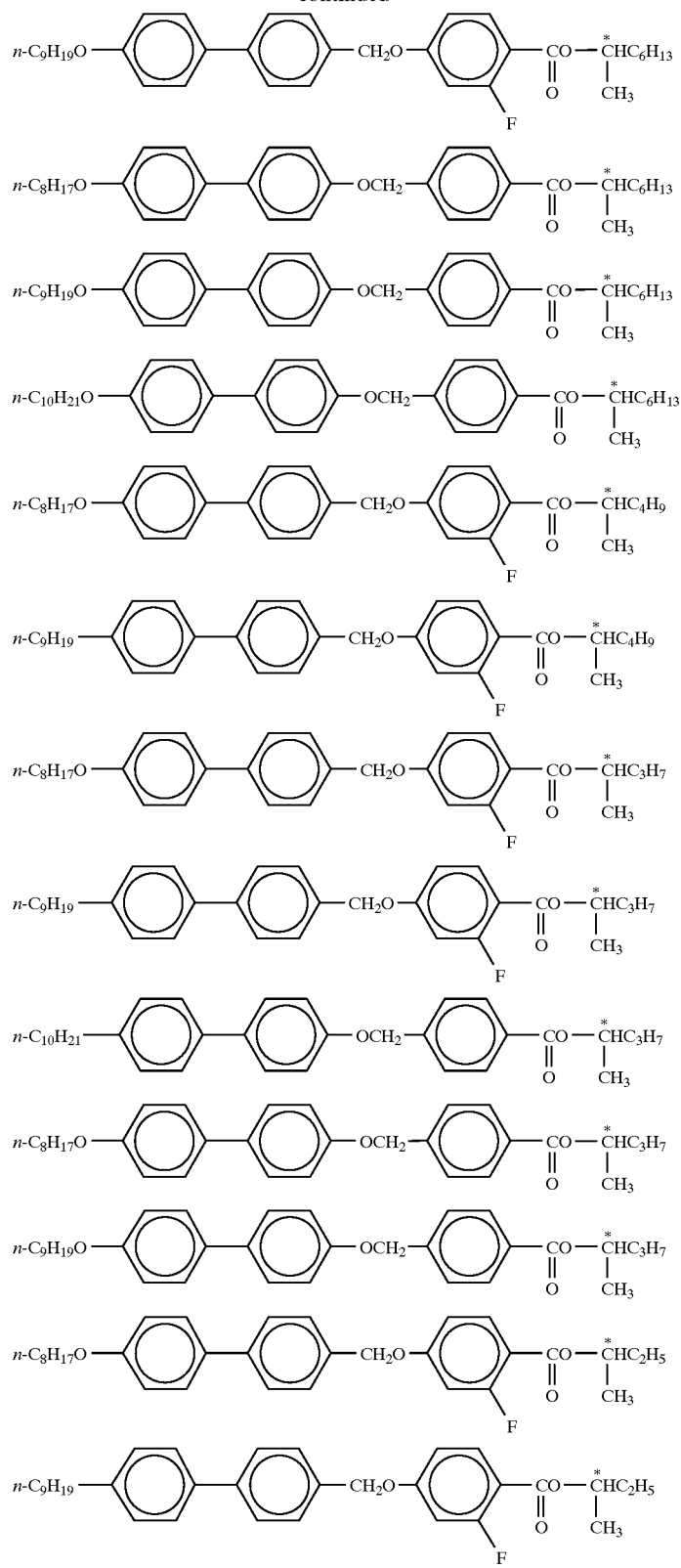
The object of the invention may also be attained by embodiments of the invention described in items (2) or (3).
(2) A ferroelectric chiral smectic Y liquid crystal composition comprising at least one first component compound selected from the group as defined in item (1), and at least one second component compound being soluble in the first component in its chiral smectic Y phase.

(3) A ferroelectric chiral smectic Y liquid crystal composition comprising at least one racemic mixture of the compound selected from the group as defined in item (1), and at least one optically active compound being soluble in the racemic mixture in its smectic Y phase.

Other embodiments of this invention are (4) a ferroelectric chiral smectic Y liquid crystal composition as defined in item (2) in which a content of the first component compound is 60% by weight or more, and (5) a ferroelectric chiral smectic Y liquid crystal composition as defined in item (3) in which a content of the racemic mixture is 60% by weight or more.

The present invention in another aspect resides in (6) a liquid crystal display element characterized by employing a chiral smectic Y phase comprising a ferroelectric chiral smectic Y liquid crystal composition as defined in any of the items (1) to (5).

BRIEF DESCRIPTION OF THE DRAWINGS

FIG. 2(*a*) shows a state ① when the applied field is lower than the threshold voltage. FIGS. 2(*b*) and 2(*c*) show states ② and ③ when the impressed field is higher than the threshold voltage. The polarities of states ② and ③ are opposite to each other. In FIGS. 2(*a*)–2(*c*), P and A indicate polarizer and analyzer directions, respectively.

DESCRIPTION OF THE PREFERRED EMBODIMENT

Figure 1:
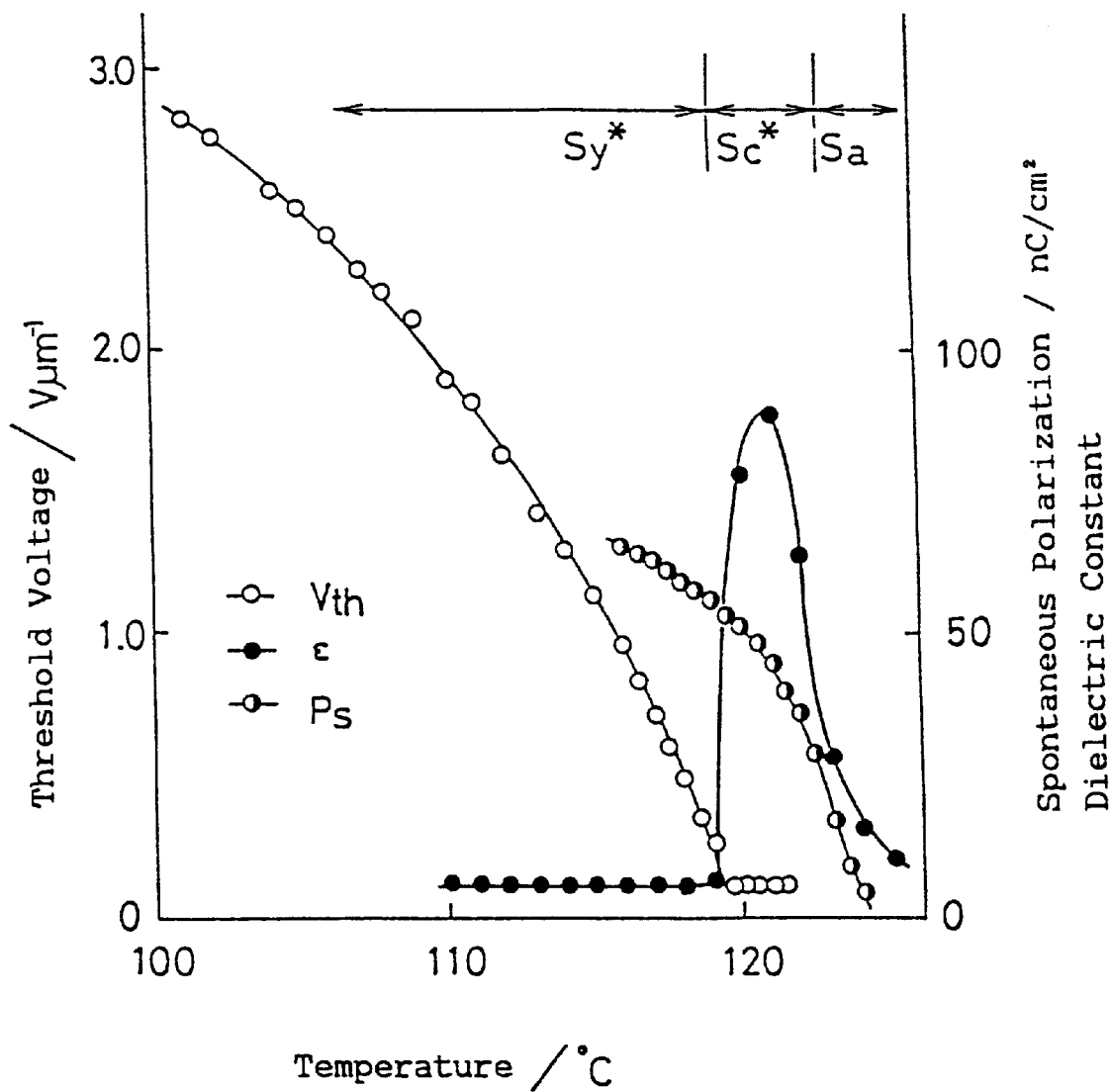
FIG. 1 shows temperature dependence characteristics of threshold voltage (Vth), dielectric constant ($\epsilon$), and spontaneous polarization (Ps) of compound (1) at its SC* and SY* phases.

As the component compound of the ferroelectric chiral smectic Y liquid crystal composition of the present invention, those described in the above item (1) are preferred. Each of those compounds exhibits an SY* phase. Other liquid crystal compounds may be usable in place of those described in item (1) as far as they exhibit an SY* phase.

Further, it may be possible to use, as a second component compound in item (2) or an optically active compound in item (3), those compounds which per se exhibit no SY* phase or no smectic Y phase (abbreviated to SY phase) but are soluble in the above-described chiral smectic Y liquid-crystalline compounds, or mixtures or racemic mixtures thereof in their SY* or SY phase to form a ferroelectric smectic Y liquid crystal mixture. Such compounds as may be preferably used as non-SY* component compounds in the ferroelectric liquid crystal composition of the items (2) or (3) include the following compounds.

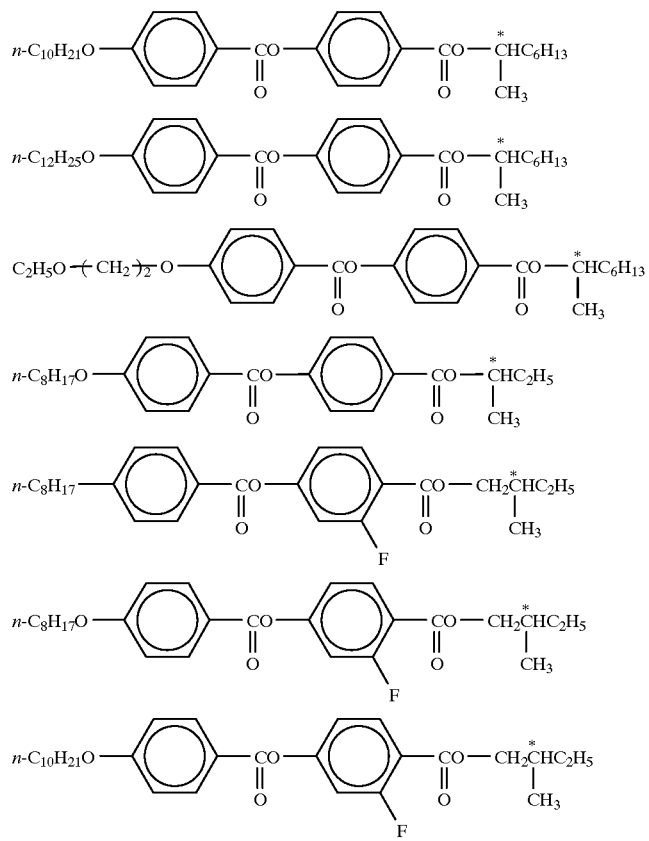

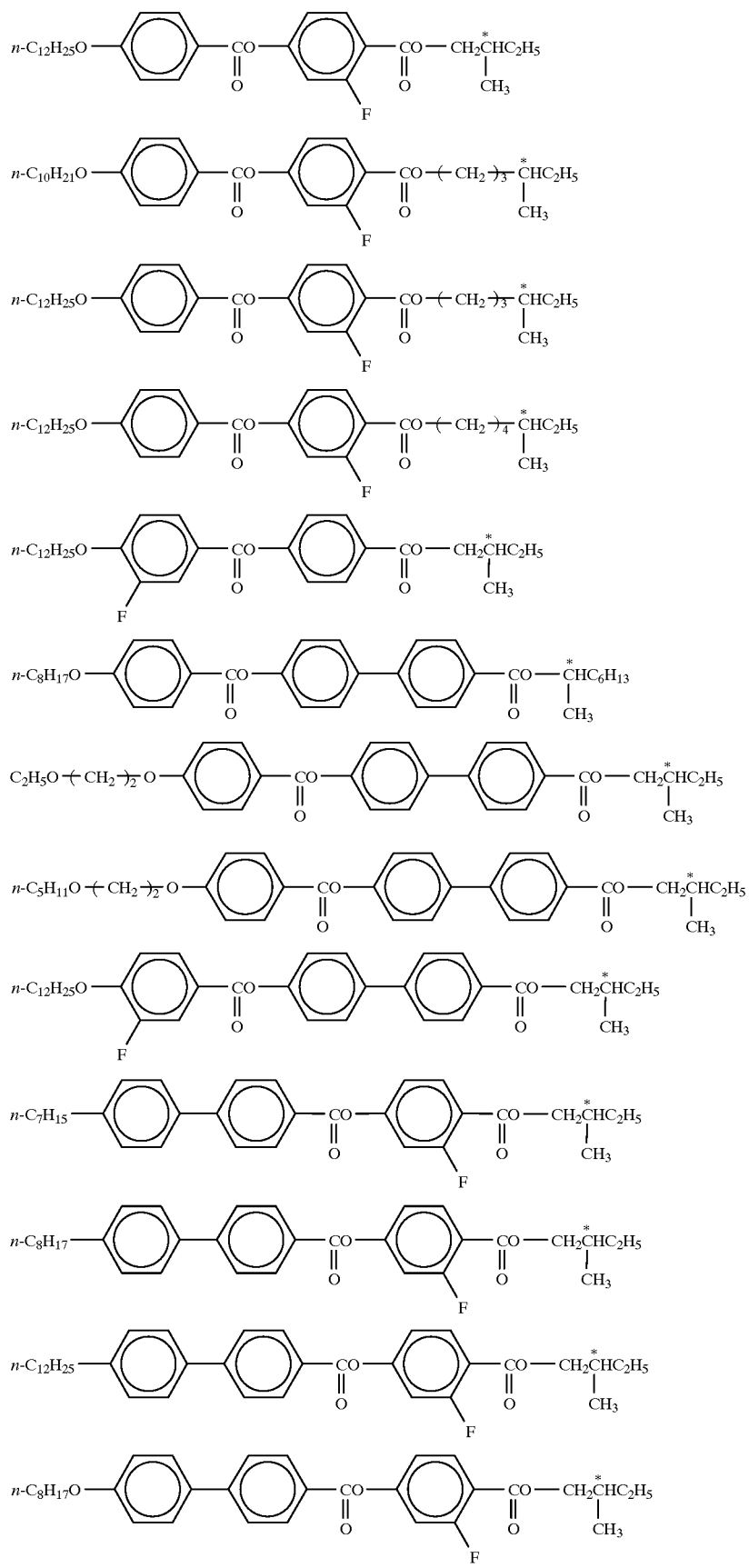

-continued
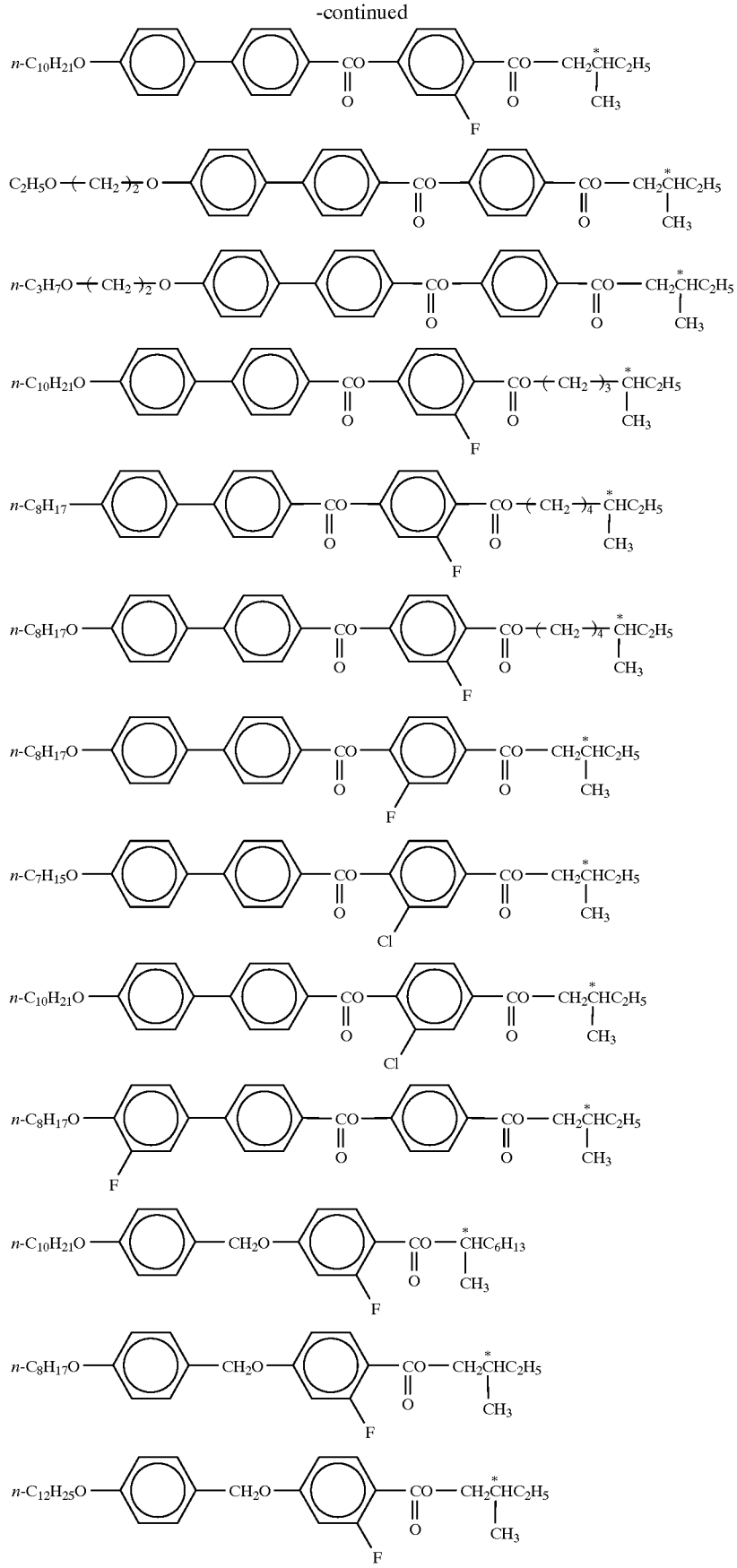

-continued
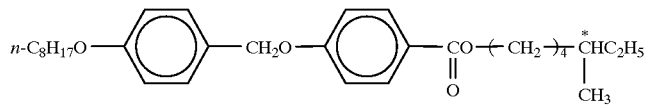
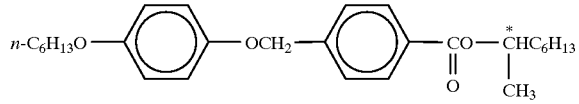
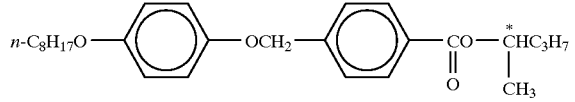
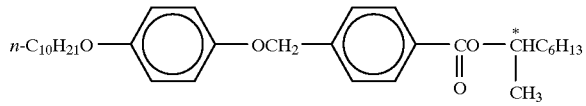
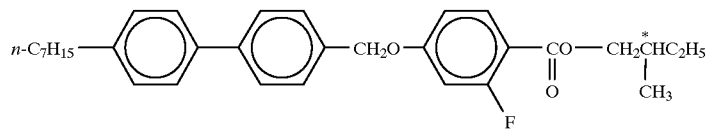
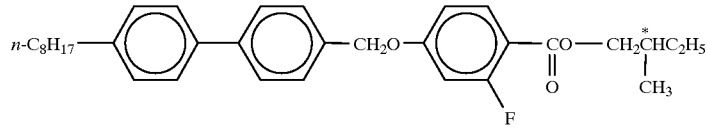
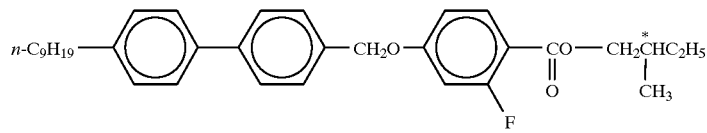
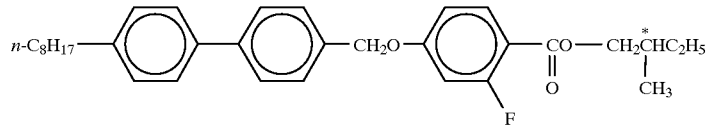
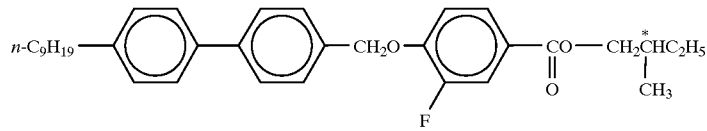
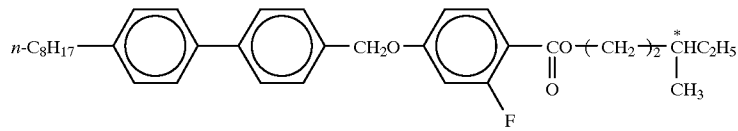
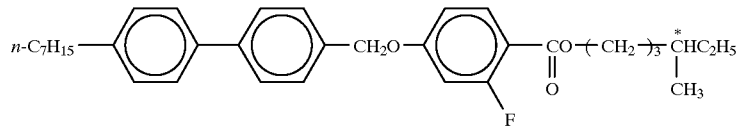
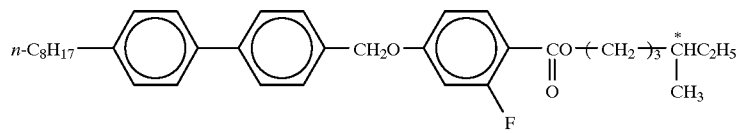
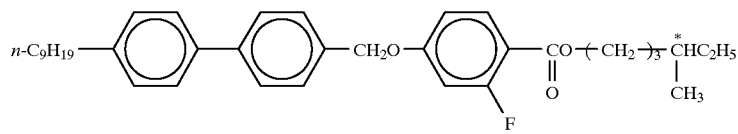

-continued

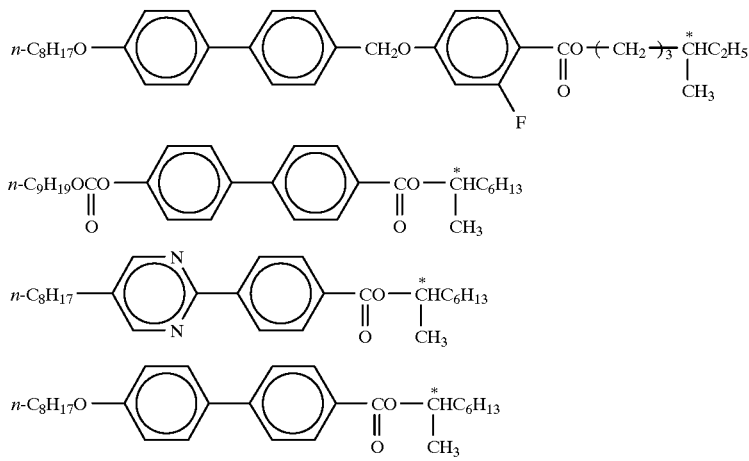

A racemic mixture of those optically active non-SY* liquid crystal compounds may also be preferred as another component of the SY* liquid crystal composition of the present invention. These non-SY* liquid crystal compounds exhibit no SY* phase or no SY phase, but they have a good compatibility with those chiral smectic Y liquid crystal compounds of the item (1) at their SY* and SY phases to form chiral smectic Y liquid crystal mixture. Accordingly, it is possible to reduce a content of the smectic Y or chiral smectic Y components by adding the above-described non-SY* component to the mixture, when no other non-SY* component is contained in the objective mixture.

However, when other non-SY* or non-SY component than the described above is contained in the composition of the invention, a content of 60% by weight or more of the SY* component is preferred. When a content of other non-SY* component than the above-described exceeds 40% by weight, a resulting mixture has an inclination to reduce or even lose its chiral smectic Y range, which is undesirable.

Further, a composition of the present invention described in any of the items (2) to (5) may contain non-liquid-crystalline optically active compounds or nematic compounds which have ever been used as a component of an SC* mixture for a chiral dopant or a mesomorphic range controller if they are soluble in an SY* composition.

Most chiral smectic Y compounds described in above item (1) and most non-SY* compounds usable as a component of the composition of the present invention are disclosed in Japanese patent application laid open Nos. 60-32747/1985, 61-210056/1986, 62-48651/1987, and 63-14758/1988. The rest of the above-described compounds may be prepared according to the methods disclosed in the above Japanese patent applications or the method modified with known synthetic unit reactions combined therewith.

A novel ferroelectric smectic Y phase will be discussed hereinafter. In the following description Cr, SG, SF, SI, SC, SA, SF*, SI*, and Iso mean crystal, smectic G, smectic F, smectic I, smectic C, smectic A, chiral smectic F, chiral smectic I, and isotropic liquid phases, respectively.

The compound (1) expressed by the following formula

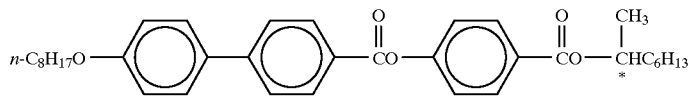

(1)

is a compound exhibiting an SY* phase. This compound has phase transition temperatures of the following.

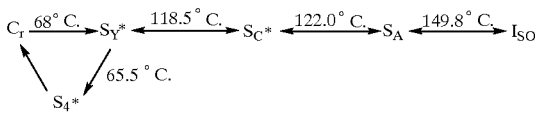

The compound (1) exhibits a broad SY* range between the temperatures of 65.5° C. and 118.5° C. A symbol S* means an unidentified chiral smectic phase. The above-described phase transition shows that a novel SY* phase is clearly distinguished from SC* phase, because the SC* phase is observed at an adjacent higher temperature side. Further, this SY* phase of compound (1) has no miscibility with any phases of the following compound expressed by the formula (2).

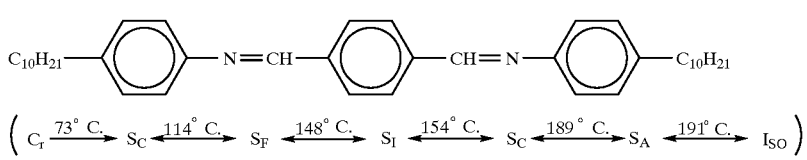

(2)

$$C_r \xrightarrow{73°C.} S_C \xleftrightarrow{114°C.} S_F \xleftrightarrow{148°C.} S_I \xleftrightarrow{154°C.} S_C \xleftrightarrow{189°C.} S_A \xleftrightarrow{191°C.} I_{SO}$$

Since SA and SC* phases of the compound (1) are miscible with the compound (2) in its SA and SC phases, respectively, the SY* phase is distinguished from any of SI, SF, and SG phases. Since selective reflection is observed at a homeotropically aligned SY* phase, it is expected that there is a helical structure in the SY* phase similar to that having been found in the SC* phase. It is reported that a helical structure is found in only three chiral smectic phases which are SC*, SI*, and SF* phases. (G. W. Gray and J. W. G. Goodby: "Smectic Liquid Crystals", Leonard Hill, Glassgow, p. 115 (1984)) However, the total results of miscibility tests and other observations made by the present inventors have led to the conclusion that the SY* phase is distinguished from any of SC*, SI*, and SF* phases and is identified as the fourth smectic phase having a helical structure. The present inventors are believed to have first found such a novel smectic phase that has never before been reported.

This SY* phase has several distinctive features from those of SC* phase which had been widely studied as a typical ferroelectric liquid crystal phase.

First, the SY* phase has an extremely small dielectric constant (abbreviated to ε) although the SY* phase, as the well as SC* phase, has a spontaneous polarization. A small ε value of a liquid crystal leads to a small electrostatic capacity of the resulting liquid crystal element which makes an electric power consumption extremely small. A liquid crystal display element employing an SY* phase can be driven with an extremely small power consumption compared with that required by an SC* phase of which ε value is more than ten times as large as that of an SY* phase. The temperature dependence of this ε value is extremely small within an SY* range.

Secondly, a spontaneous polarization varies continuously even at a phase transition temperature between the SC* and SY* phases as shown in FIG. 1. This continuity of a Ps vs. temperature curve at a phase transition point is in contrast to discontinuity of a Ps curve at the phase transition point between the SC* and SI* phases of a compound expressed by the formula

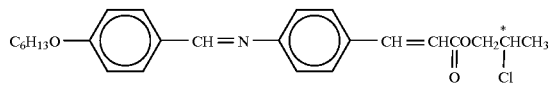

and this discontinuity has been reported by J. Wahl and S. C. Jain ("Ferroelectrics" 59, p. 161 (1984)).

Thirdly, the SY* phase is characterized by having a varying threshold voltage (abbreviated to Vth) which is an applied least D.C. field required to align liquid crystal molecules. The Vth value increases as the temperature goes down within-the SY* phase.

Figure 2A:
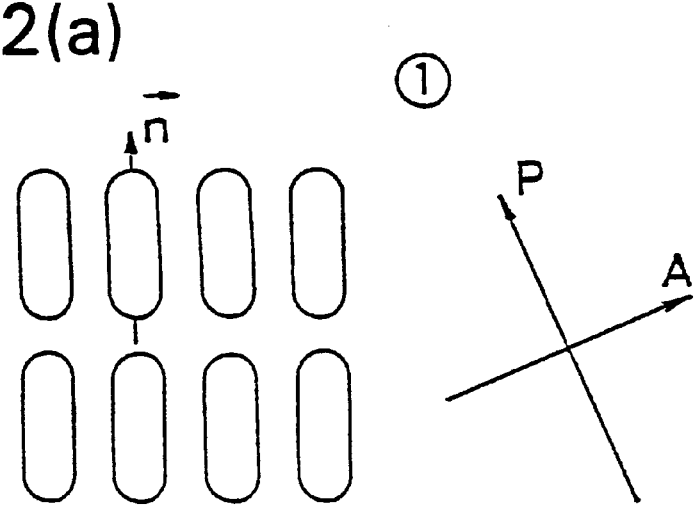
FIGS. 2(*a*)–2(*c*) each show a director vector ($\vec{n}$) of liquid crystal molecules in the SY* phase when the applied electric field varies.
Figure 2B:
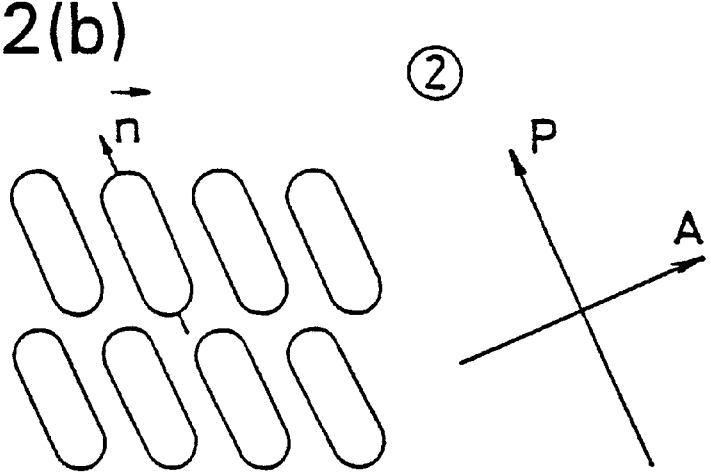
Figure 2C:
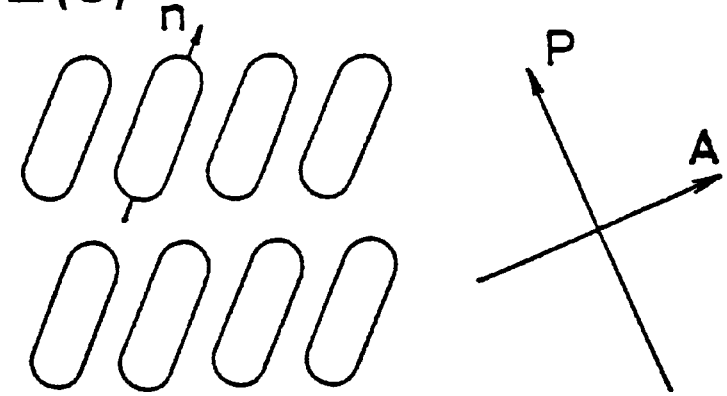

FIGS. 2(a)–2(c) illustrate aligned states of liquid crystal molecules in the SY* phase by using a director vector (abbreviated to $\vec{n}$) which is an average direction of longitudinal axes of liquid crystal molecules. State ① illustrates an alignment when an applied voltage is lower than Vth. State ② illustrates a director when an electric field higher than Vth is applied to the molecules according to the direction from the front surface of the drawing to the back. The direction of the applied field in state ③ is opposite to that in state ② which is from the back surface to the front face of the drawing. Aligned states of molecules at SC* phase are known to be limited to the two states of ② and ③. An electro-optic switching phenomenon between these two stable states is used in a display element employing an SC* phase.

It is also noticed that in the SC* phase a low value of Vth is required to turn the director, whereas a Vth is high in the SY* phase (refer to FIG. 1). Further, it is worthy of note that at SY* phase molecules may be aligned into the state ① of FIG. 2(a), when the applied voltage is lower than Vth. This means that in the SY* phase the director can take three directions by varying a polarity and a value of the electric field applied. This is a significant feature of the SY* phase which has never been shown by an SSFLC mode liquid crystal display element employing an SC* phase that can take only two stable states of a director.

Figure 3:
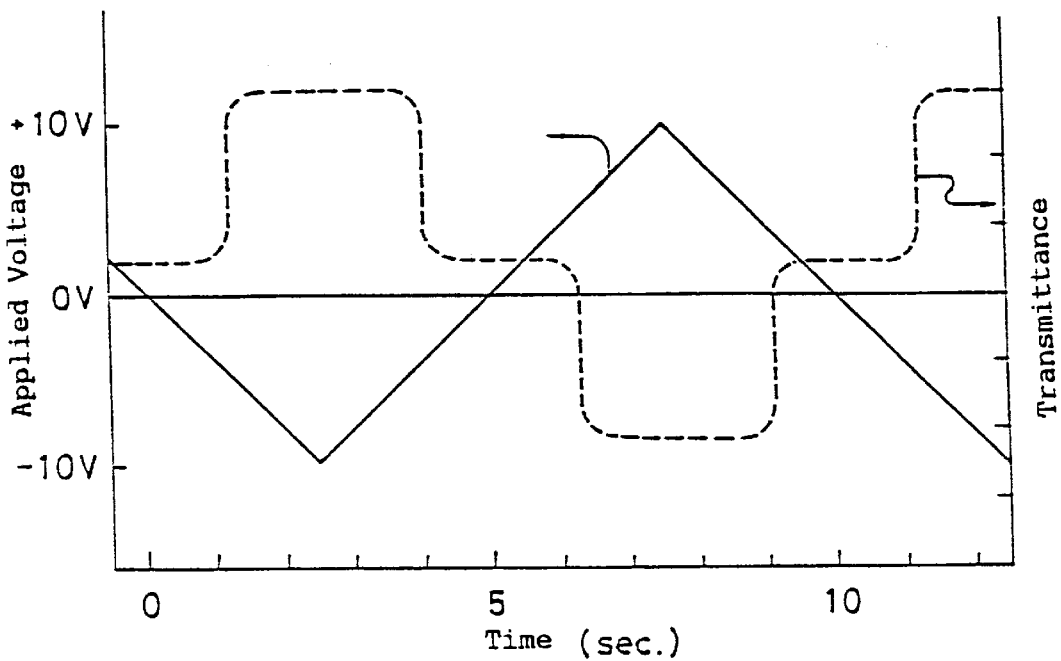
FIG. 3 shows optical transmittance in the SY* phase when a trianguler wave is applied.
Figure 4:
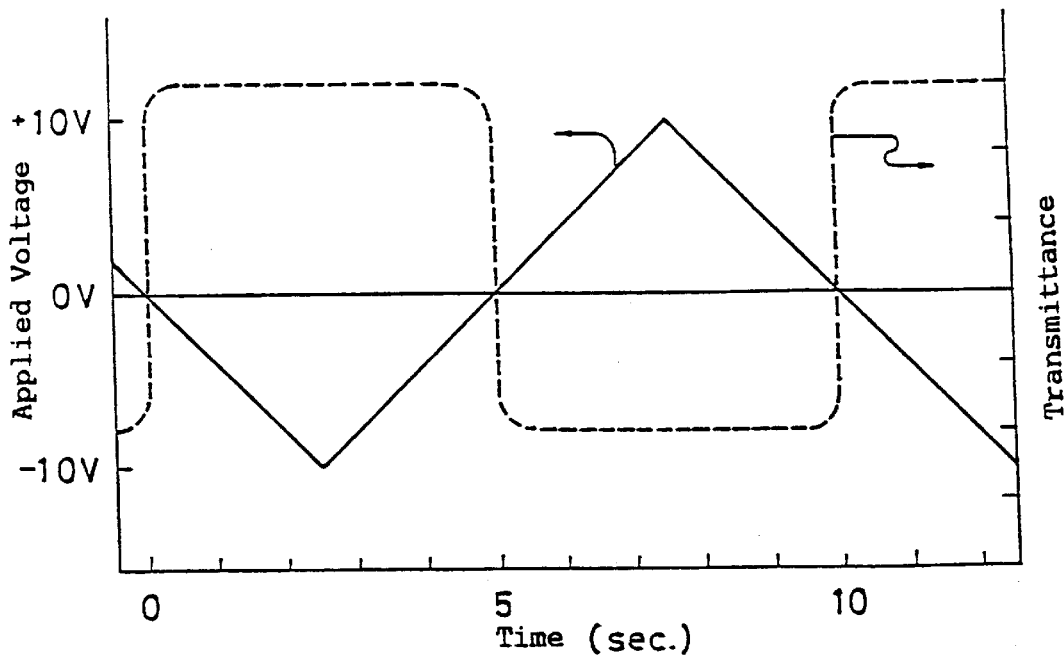
FIG. 4 shows optical transmittance in the SC* phase.

An electro-optic characteristic of a liquid crystal display element employing an SY* phase is expressed by variation of optical transmittance as shown in FIGS. 3 and 4. FIG. 3 shows a variation of optical transmittance of a homogeneously aligned cell keeping the compound (1) in the SY* phase in the cell having a cell gap of 2 μm, when the cell is sandwiched between two polarizers perpendicularly crossed to each other and a triangular wave having a peak value of ±10 V and a period of 0.1 Hz. is impressed across the cell. FIG. 4 shows a variation of transmittance of the same cell in the SC* phase under the same electric field. As is clear from those two figures, in the SC* phase only two states of light and dark are available, while in the SY* phase a state of intermediate brightness is additionally available in a considerably broad voltage range including 0 V at its center. This means that a dichromatic display is easily available by controlling an impressed voltage in the SY* phase. The dichromatic display may exhibit a figure in two different degrees darkness or lightness for example, a black and white figure on gray ground, a white and gray figure on black ground, etc. The dichromatic display may be expected for a display panel for the game of Go or the reverse in which black and white figures are required together with the gray ground. Further, it becomes possible to add an indicator or an emphatic mark on a monochromatic display by introducing a third tone of darkness. The dichromatic display may also be applied to a light valve or a high multiplexed display panel, a traffic signal, and other outdoor display panels. The dichromatic display is expected to be used in place of a present liquid crystal display.

This specific feature of the dichromatic display is maintained when the cell gap is widened, hence, it may have a commercial advantage over a monochromatic SSFLC mode display which can only be used with cells having a thinner cell gap.

Another specific feature of an SY* phase is that an optical anisotropy (abbreviated to Δn) at the intermediate state ① in FIG. 2(a) is different from those at states ② and ③ in FIGS. 2(b) and 2(c). For example, compound (1) exhibits a Δn of 0.11 at slate ① and a Δn of 0.16 at states ② and ③. It has never been recognized at SC* phase that Δn varies according to a state of a director of the liquid crystal molecules. As is well-known, coloration of display appearing in an electrically controlled birefringence effect mode according to retardation of transmitted light depends on the value of dΔn which is the product of an optical anisotropy (Δn) and a cell gap (abbreviated to d). So, it is possible to exhibit a different color, as well as a different darkness or lightness, at state ① from those at states ② and ③ when a cell having a comparatively large cell gap is used.

Therefore, a combination of two colors may freely be selected to exhibit not only a dark and light dichromatic display but also a colored dichromatic display. For example, when compound (1) is kept in a cell having a gap of 6 μm, a dichromatic display in three colors of orange, blue and black is available; a cell having a gap of 5 μm and keeping the same compound may exhibit three colors of purple, yellowish-green and black.

When an electro-optic characteristic is observed for the total area of a display cell, the characteristic curve is not so steep because the alignment of the liquid crystal molecules is not perfectly uniform. Thus, combined states of ① and ② or of ① and ③, as shown in FIGS. 2(a)–2(c) appears when the applied voltage is in close proximity to the higher side of the threshold voltage. The proportion of the state ① to state ② or of the state ① to state ③ in these combined states may depend on the electric field impressed, gradation of display available by controlling the impressed voltage. A steepness of an electro-optic characteristic may be varied by changing an aligning film of the cell or by controlling a cooling rate at initial alignment stage.

Figure 5:
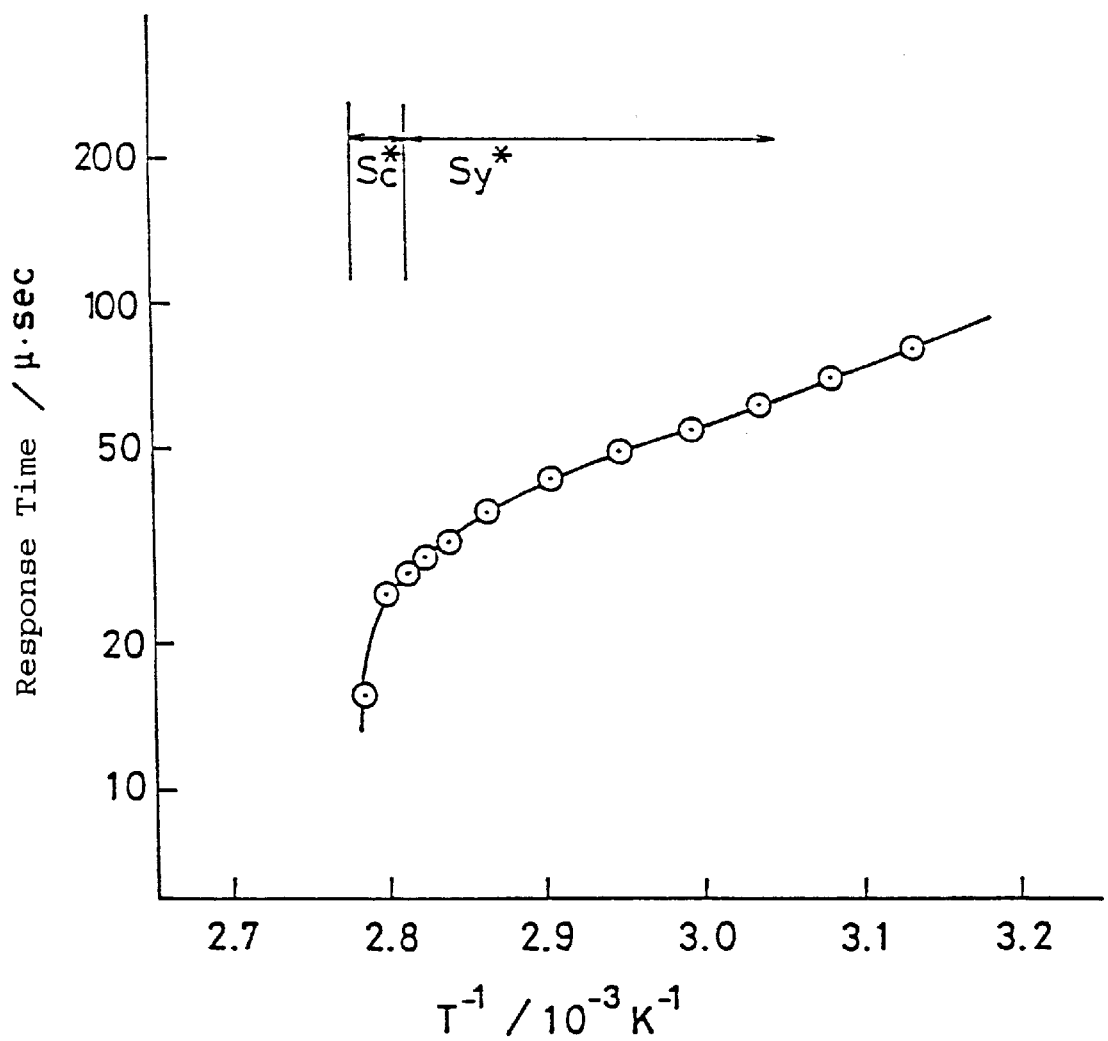
FIG. 5 shows temperature dependence of electro-optic response of compound (3) in its SC* and SY* phases.

FIG. 5 shows electro-optic response characteristics of the cell obtained in SY* and SC* phases by employing a compound expressed by the following formula (3).

perature dependence of response time is less in the SY* phase than in the SC* phase as illustrated in FIG. 5. This characteristic feature is one of the desired properties of a liquid crystal display element.

Significant features of the novel SY* phase are described hereinbefore in comparison with those of the SC* and other known ferroelectric smectic phases exemplifying an SY* phase of compounds. Most aforementioned features of an SY* phase are similarly applied in the case of an SY* phase of a mixture. Hereinbefore are described concrete compounds having an SY* phase, and concrete optically active compounds being recognized to be soluble in the SY* phase. Unidentified liquid crystal phases of other compounds may easily be identified as or discriminated from an SY or SY* phase through a comparative microscopic observation of liquid crystal textures or through a miscibility test employing the above-described compounds as a standard compound.

By utilizing the aforementioned features of a liquid crystal mixture having an SY* phase, there is provided a novel liquid crystal display element which can exhibit gradation and have a large electro-optic response. A method for driving this novel liquid crystal display element includes, an SSFLC mode, as well as an electrically controlled birefringence mode in which a cell having a comparatively large cell gap is employed as mentioned before, a deformation of a helicoidal structure mode, a trangent scattering mode, a guest-host mode employing a pleochroic dye, and those display modes which are applicable to any liquid crystal cell utilized at SC* phase.

As to materials for aligning films of an SY* liquid crystal cell, similar materials to those used in an SC* liquid crystal cell may be used because both SY* and SC* phases have ferroelectricity. Such materials include polyvinyl alcohols, polyimides, silicon monoxide, silicon dioxide, polyacrylonitriles and alumina.

In addition to the aforementioned arts, a lot of techniques known to be applied in ferroelectric SC* liquid crystal

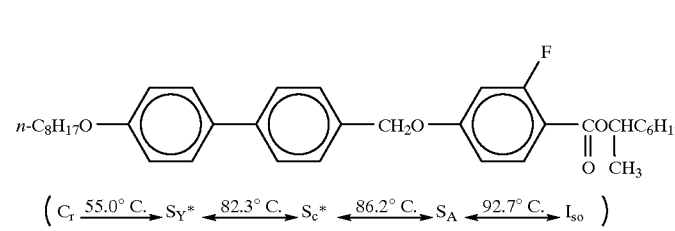

(3)

The electro-optic response was observed by impressing a rectangular wave of ±10 V, 50 Hz to the homogeneously aligned cell having a cell gap of 2 μm and a pair of ITO electrodes, the cell being sandwiched between two polarizer plates perpendicularly crossed to each other. In FIG. 5, results observed at SY* phase supercooled below the melting point are included.

It is known that in general an electro-optic response is slower in a lower temperature phase than in a higher temperature phase because of a higher viscosity. It is generally known that an electro-optic response curve is discontinuous to sake a step at the phase transition point between SC* and SI* phases. On the contrary, the response curve has no such step or leap and is continuous at phase transition from SC* to SY* phases as shown in FIG. 5. Namely, it may be proposed that the response time at SY* phase is substantially the same as that at SC* phase. Additionally, a temmixtures and in a display element employing the mixture may be applied to the SY* liquid crystal mixture and SY* liquid crystal display. It may be stated, as an application of those known arts, that it is more preferred from the point of view of aligning properties for an SY* mixture to have an SA phase in a higher temperature side, although other properies of the mixture are not influenced by whether or not the mixture has any of SC*, SA or cholesteric phases in a higher temperature side to an SY* phase. Another known art recommends that a mixing proportion of a component having an SA phase be increased in order to maintain an SA phase in the resulting mixture.

Needless to say from other known art that ferroelectric SY* component compounds should have the same sign of Ps, while the absolute, configuration of the optically active compounds may be either sinister (S–) or rectus (R–) types.

The present invention will be described in detail by way of examples but the invention is not construed to be limited thereto.

EXAMPLE 1

A liquid crystal composition A consisting of the following compounds is prepared.

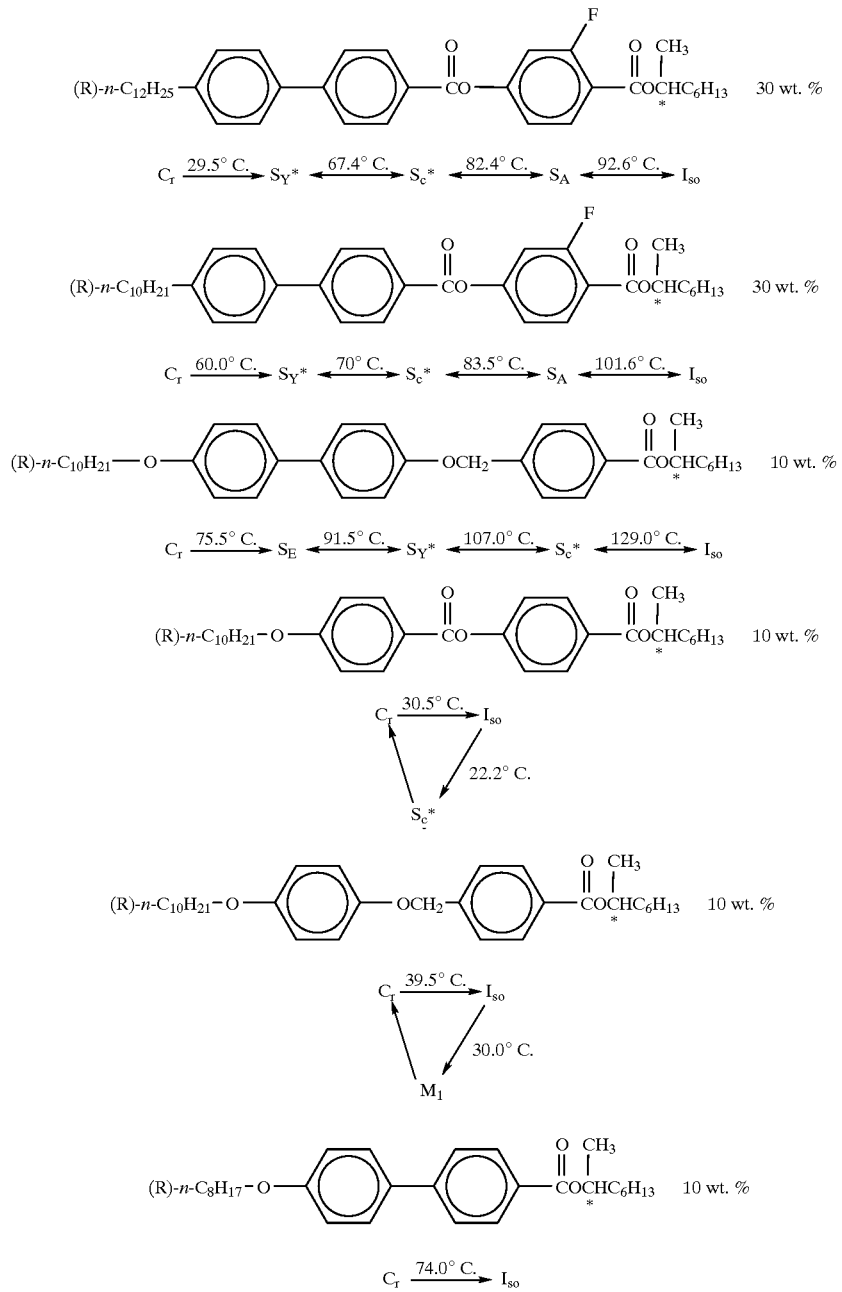

and the composition had a broad SY* range including a room temperature.

Phase transitions of each component compound is are described next to each compound. In the description, $M_1$ means an unidentified mesophase and SE represents a smectic E phase.

This composition exhibits phase transition temperatures of the following

As is shown, non-SY* component compounds (i.e. the fourth to sixth compounds) may be mixed with the SY* component compounds of the first to third compounds to form an SY* composition.

This composition had a Ps of 97 $nC/cm^2$ at 25° C.

In addition, the SC* phase of this composition may also be used in a liquid crystal display.

EXAMPLE 2

A liquid crystal composition A prepared in Example 1 was kept in a cell having a gap of 2 μm and a pair of ITO electrodes to prepare a homogeneously aligned liquid crystal element.

When this liquid crystal element was sandwiched between two polarizer plates crossed perpendicularly to each other, and a rectangular wave of ±20 V and 50 Hz was impressd to the element, an electro-optic response was observed at 25° C. to give a response time of 50 microsecond.

This response was so quick that the liquid crystal element was very effective as a display element.

EXAMPLE 3

A liquid crystal composition A prepared in Example 1 was kept in a cell having a gap of 4 μm and a pair of ITO electrodes to prepare a homogeneously aligned cell. When the cell was placed between two polarizer plates crossed perpendicularly to each other and a triangular wave of ±10 V and 0.1 Hz was applied to the cell, a periodical color change having a cycle comprising dark, orange and blue colors was observed.

What is claimed is:

1. A liquid crystal display comprising a composition having a chiral smectic Y phase and capable of electrooptically switching between three stable states in said chiral smectic Y phase.

2. The liquid crystal display according to claim 1 wherein the composition further comprises a first component comprising at least one member selected from the group consisting of the following compounds:

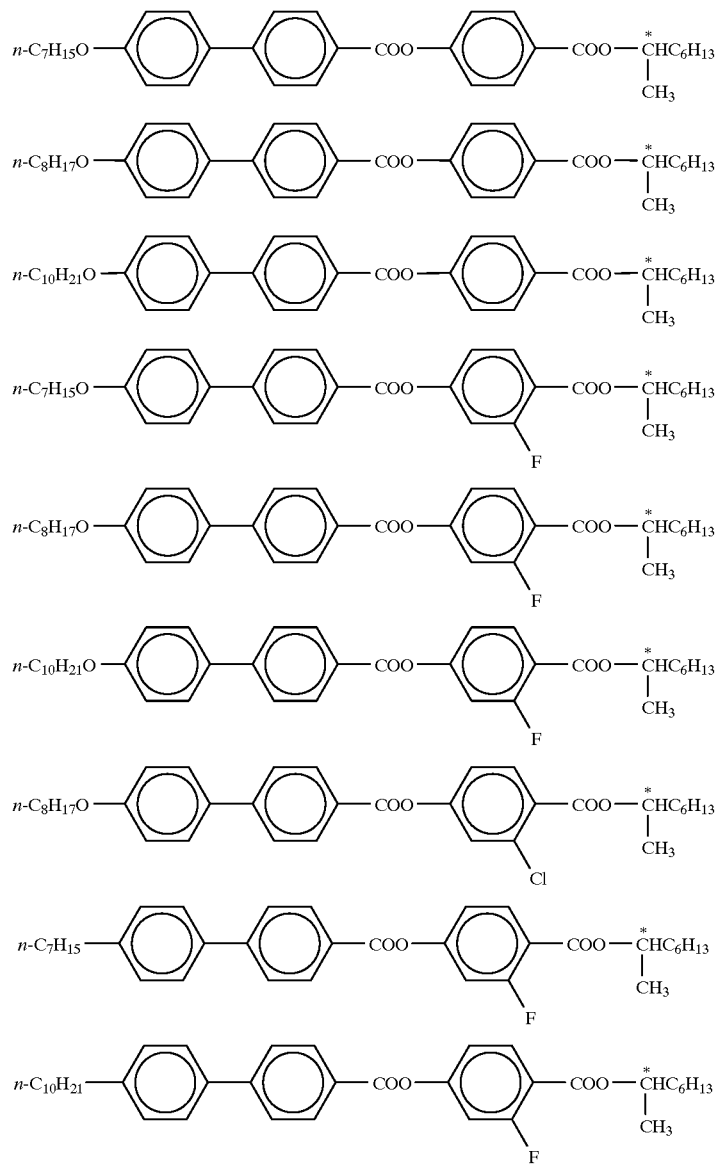

-continued
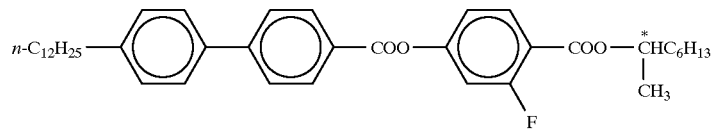
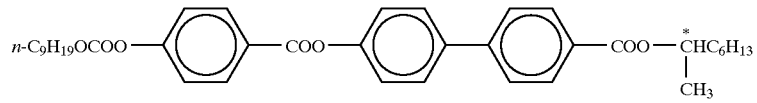
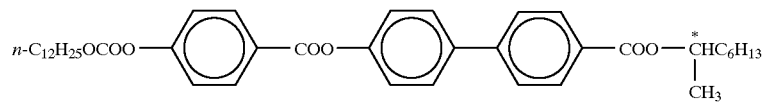
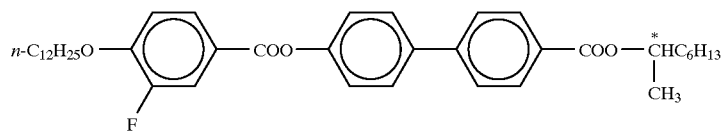
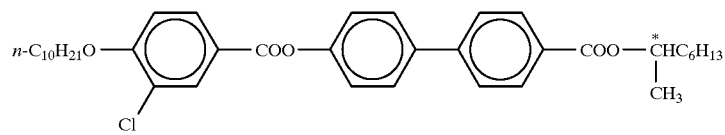
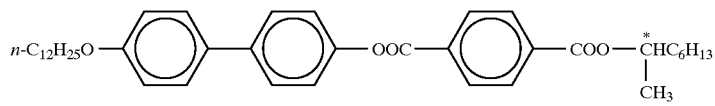
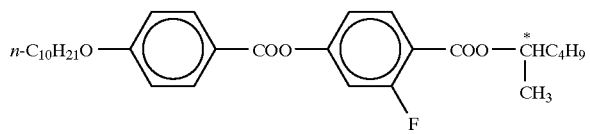
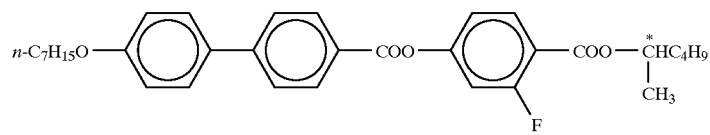
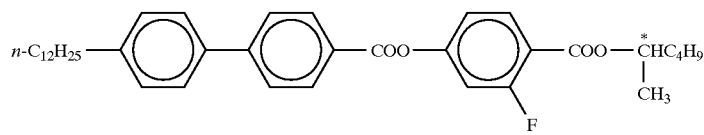
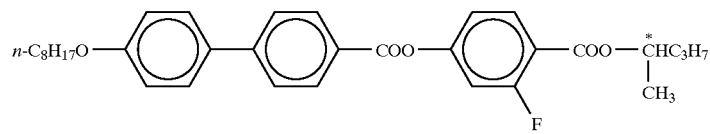
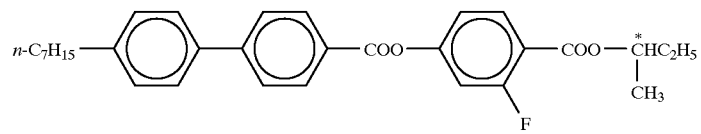
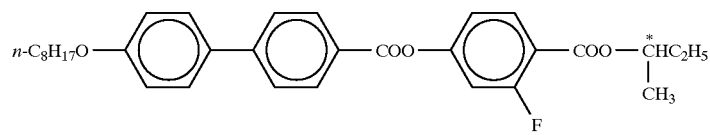

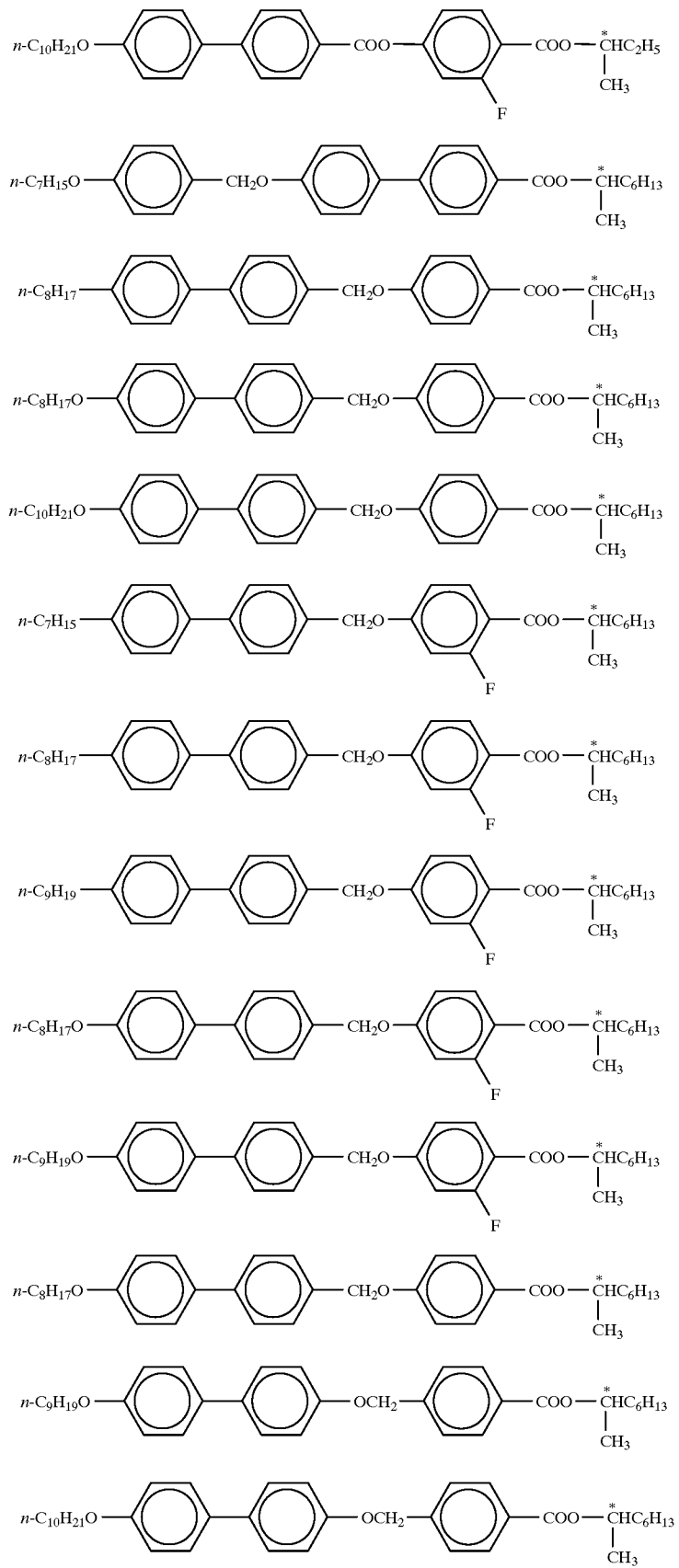

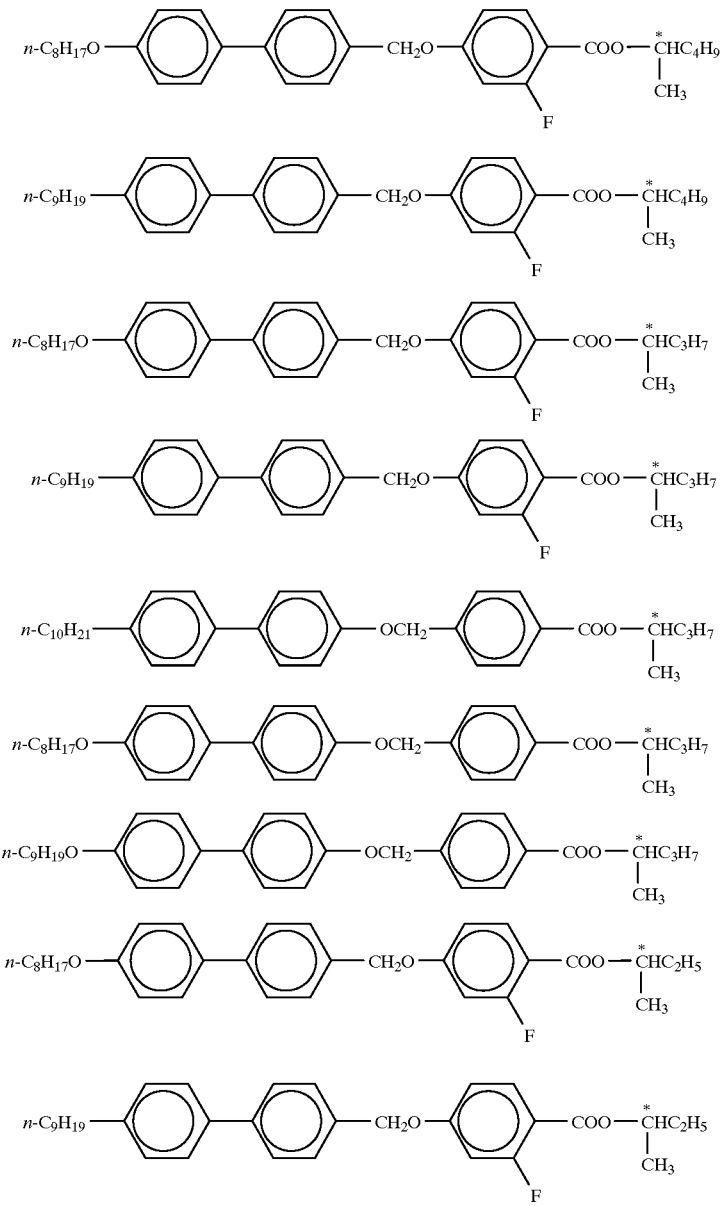

3. The liquid crystal display according to claim 2 wherein said first component comprises at least two members selected from the group.

4. The liquid crystal display according to claim 2 wherein the composition further comprises a second component comprising at least one optically active compound which is soluble in the first component in the chiral smectic Y phase.

5. The liquid crystal display according to claim 2 wherein said first component comprises at least one racemic mixture and said composition further comprises a second component comprising at least one optically active compound which is soluble in the first component in the chiral smectic Y phase.

6. The liquid crystal display according to claim 3 wherein said composition comprises at least 60% by weight of said at least two members.

7. The liquid crystal display according to claim 4 wherein said composition comprises at least 60% by weight of said first component.

8. The liquid crystal display according to claim 4 wherein said at least one optically active compound is selected from the group consisting of the following compounds:

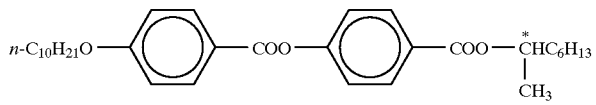

-continued
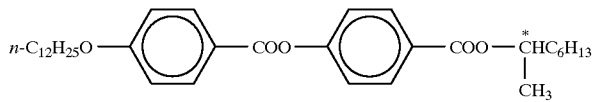
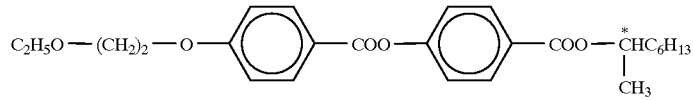
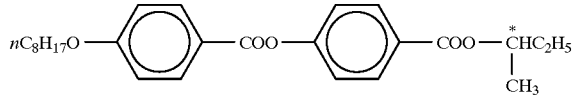
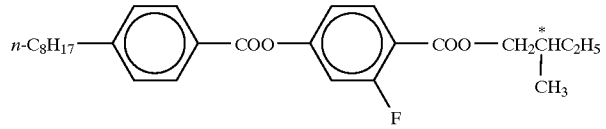
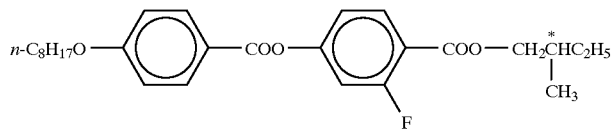
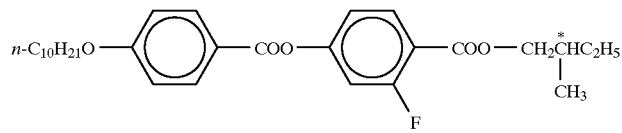
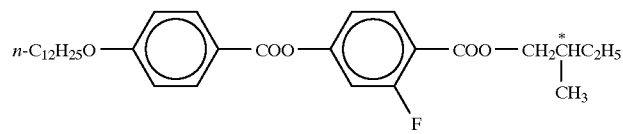
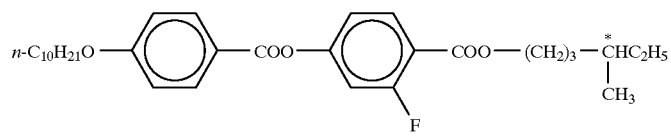
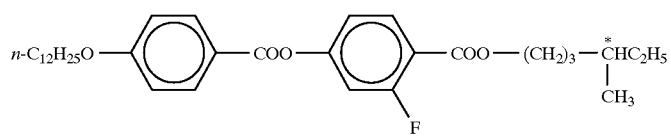
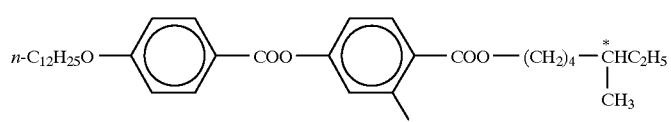
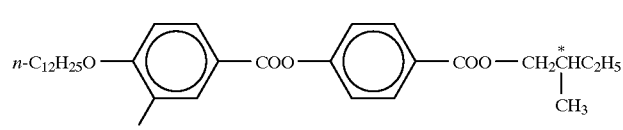
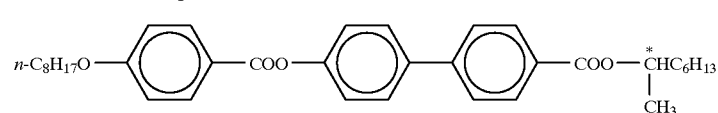
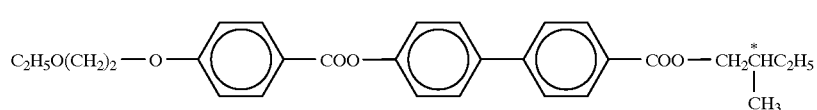

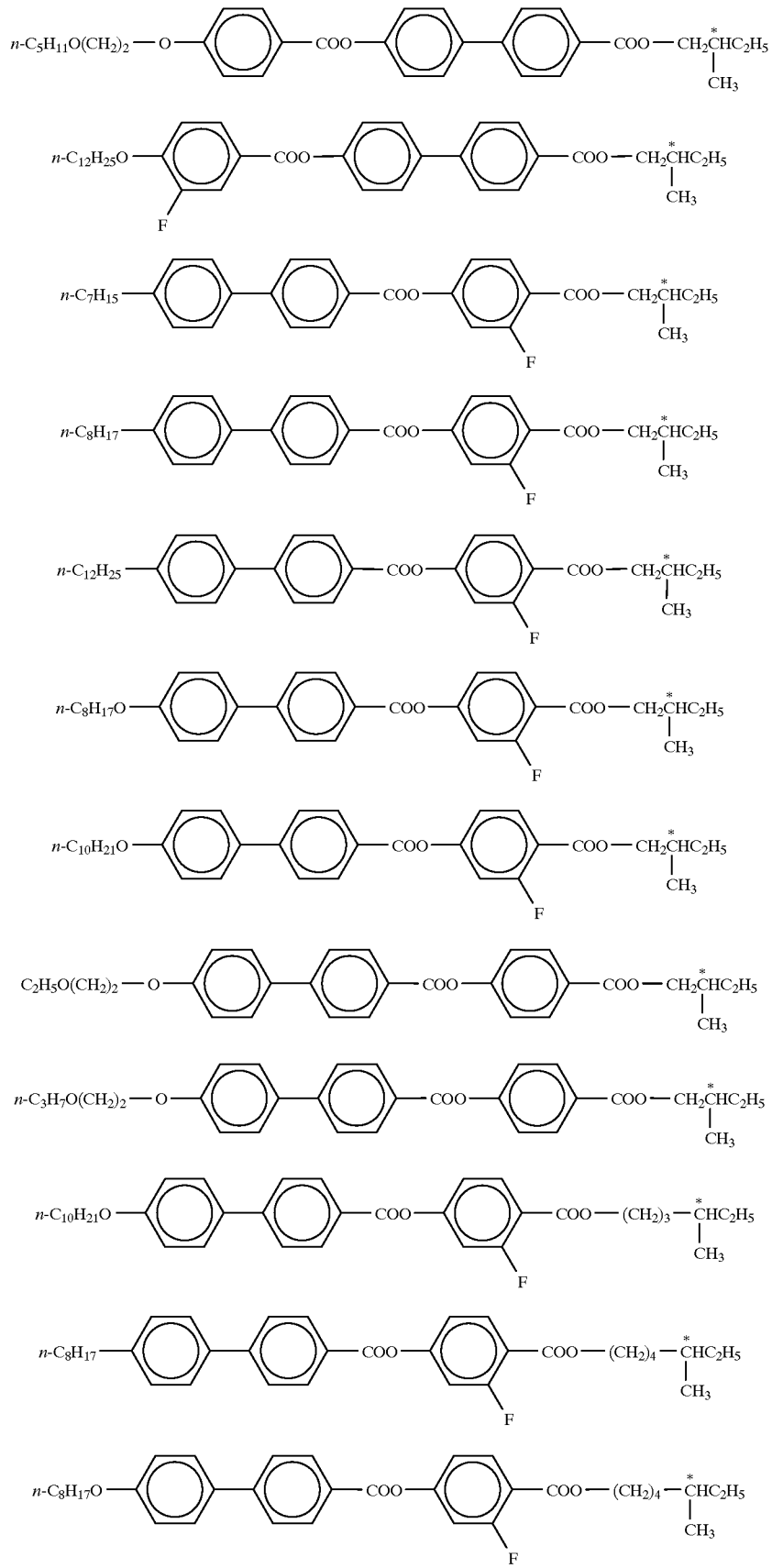

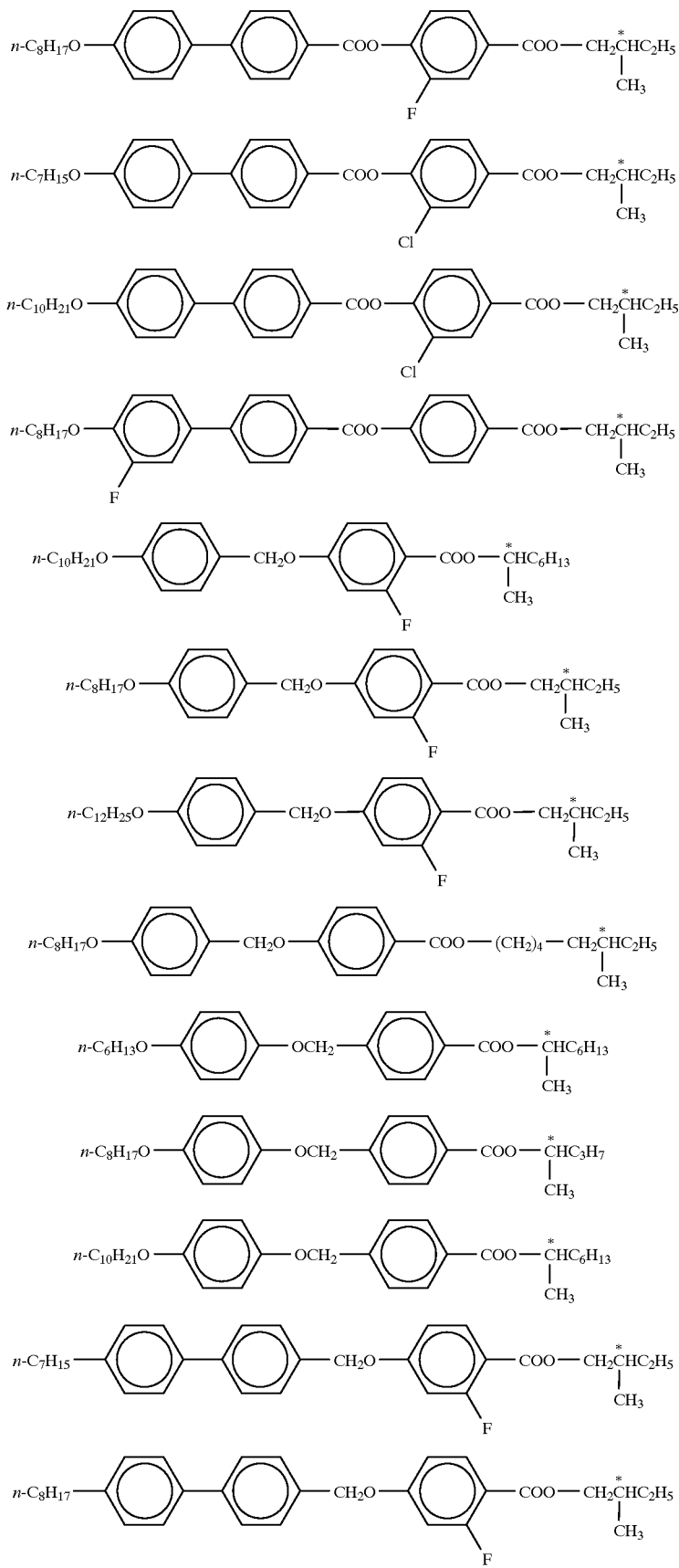

-continued
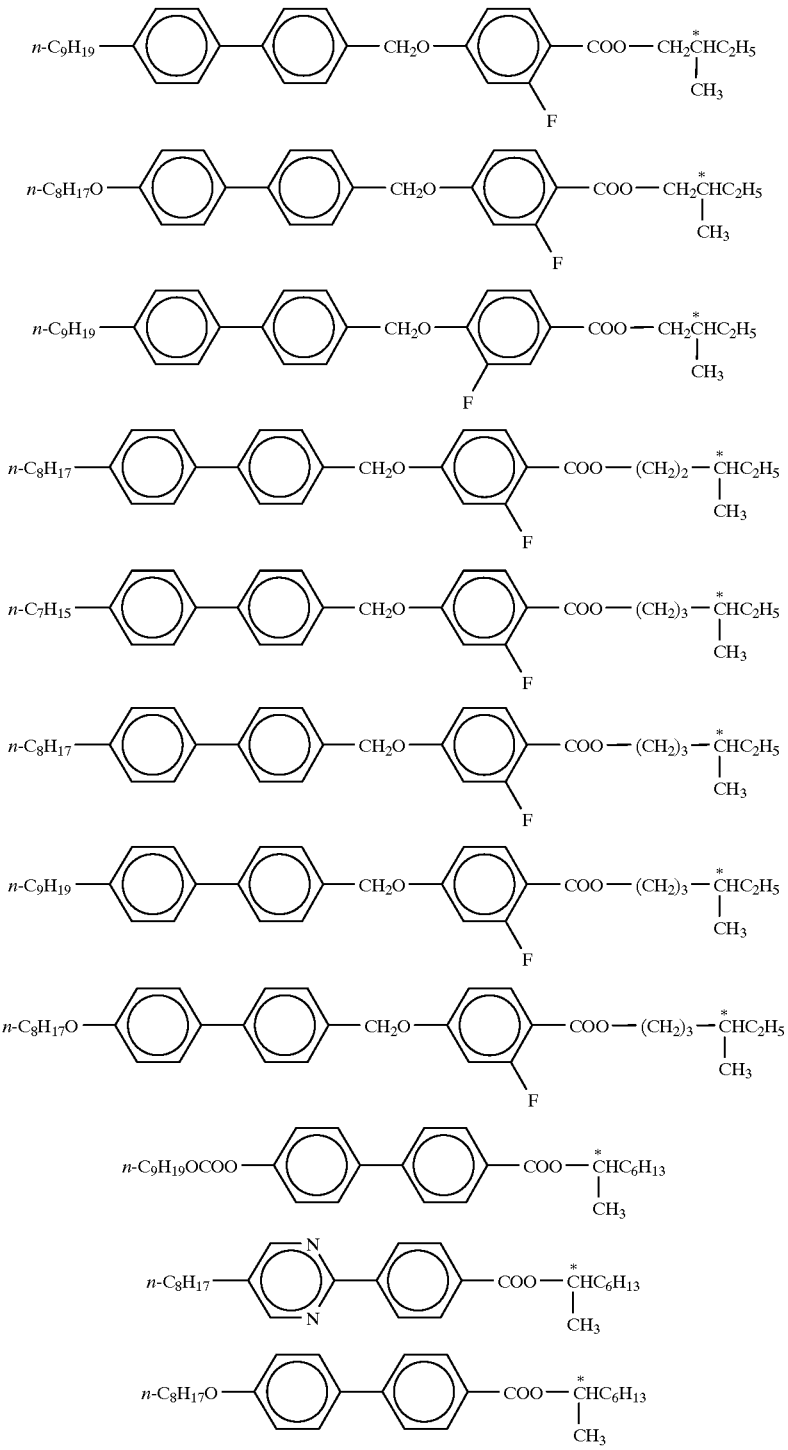
9. The liquid crystal display according to claim 5 wherein said at least one optically active compound is selected from the group consisting of the following compounds:

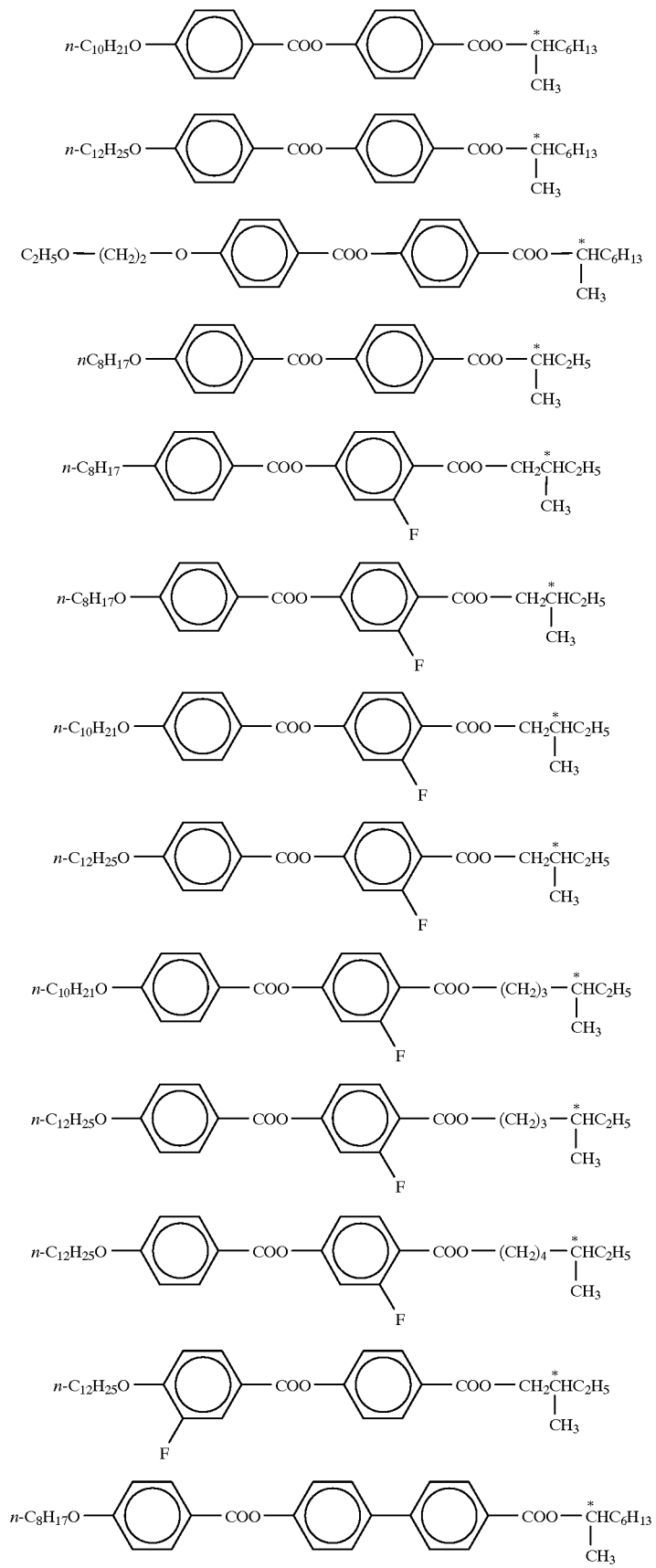

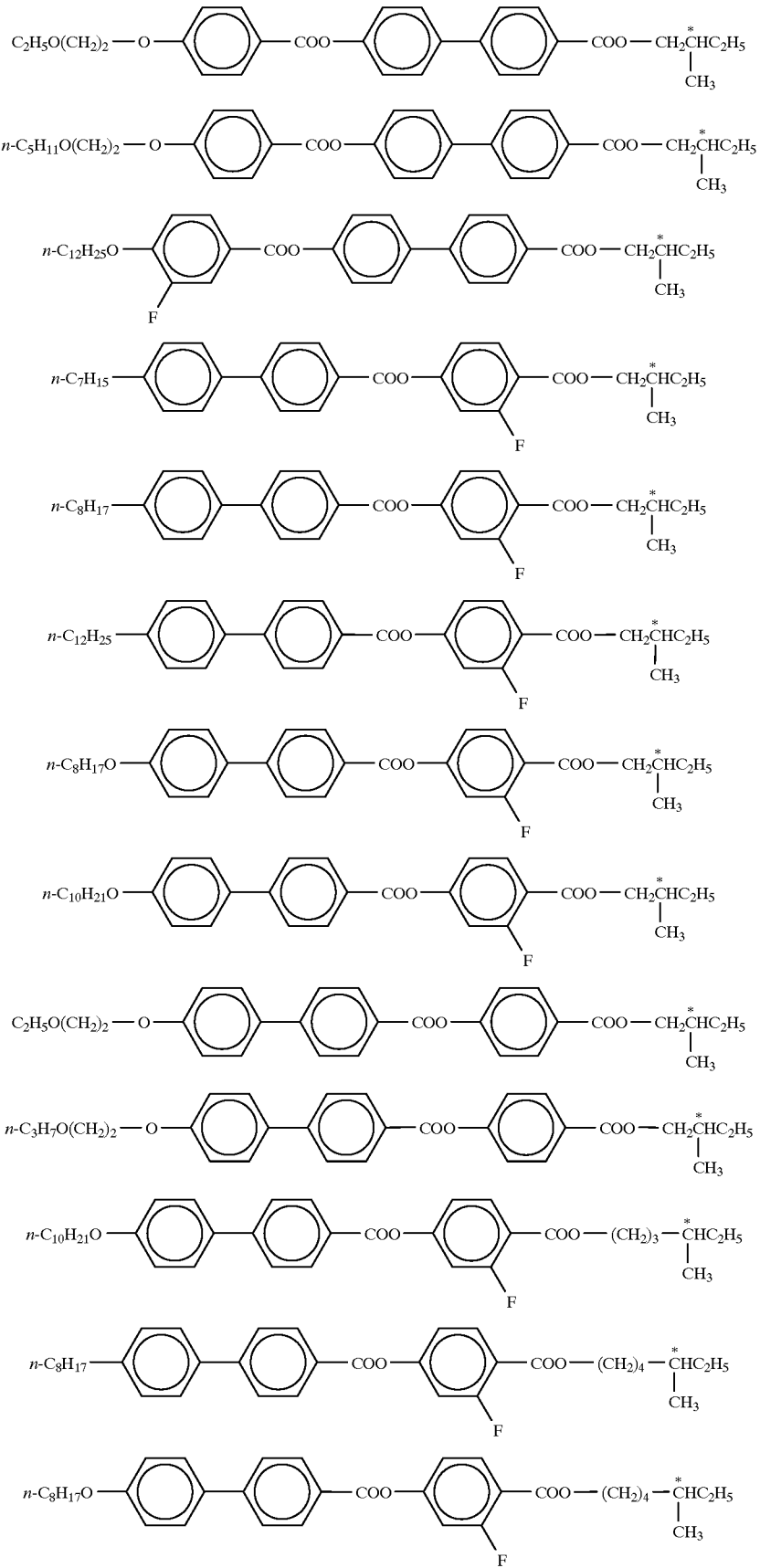

-continued
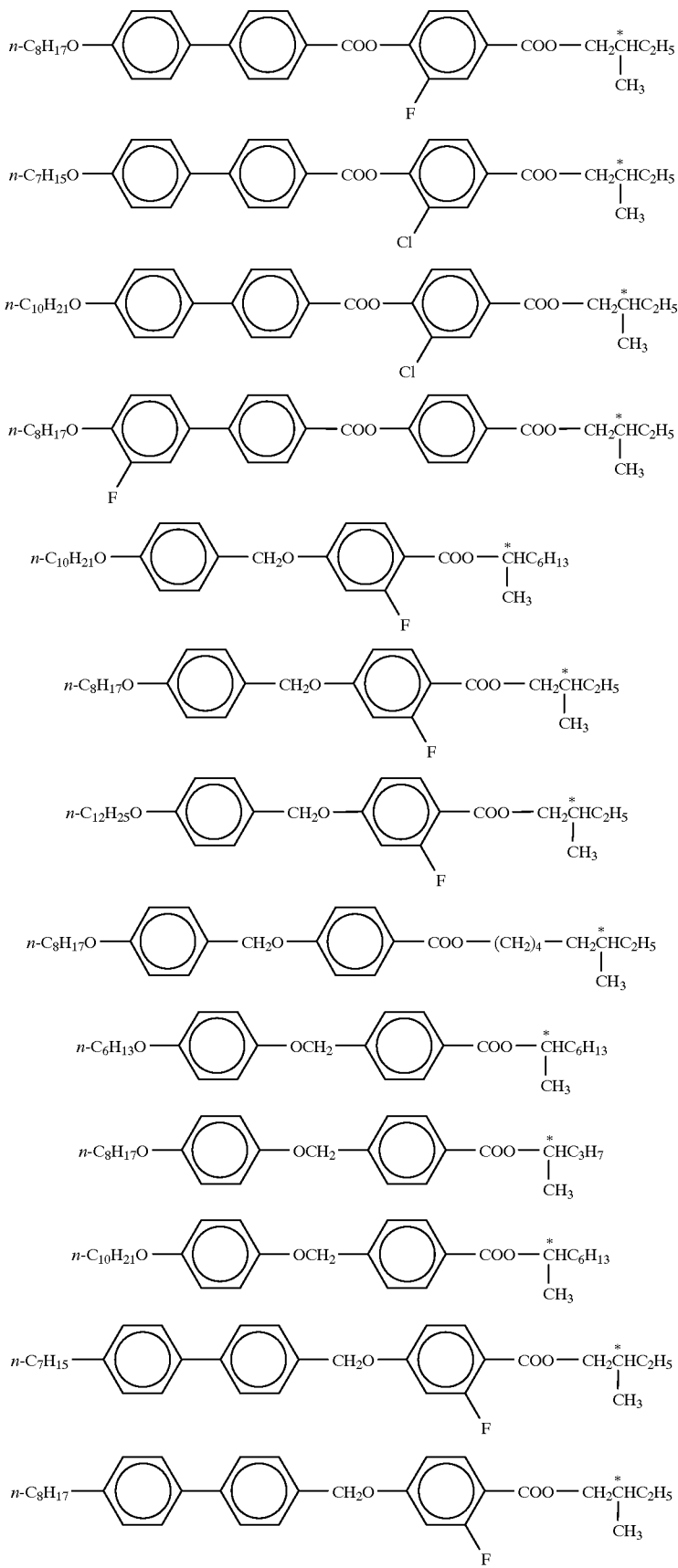

-continued
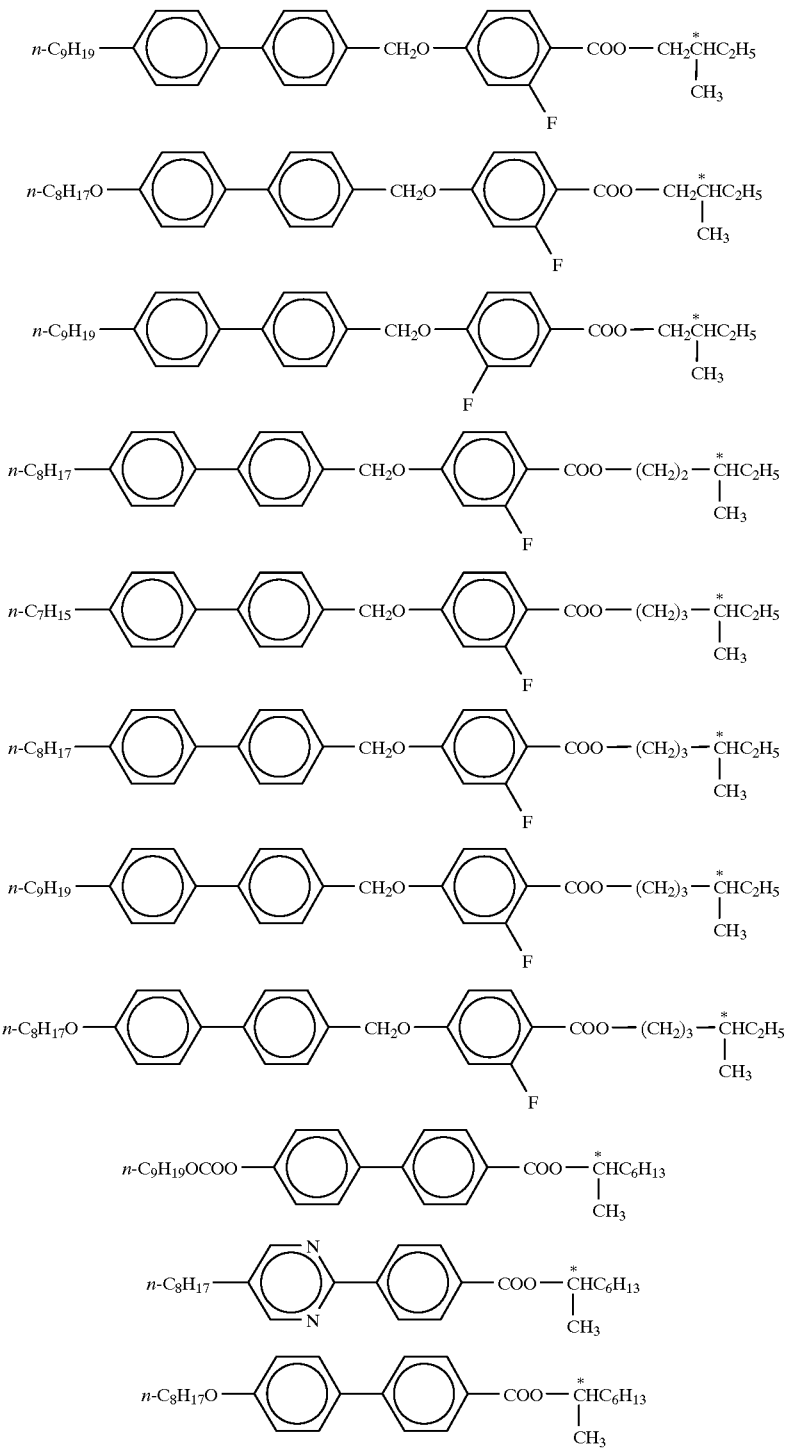
10. The liquid crystal display according to claim 7, wherein said at least one optically active compound is selected from the group consisting of the following compounds:

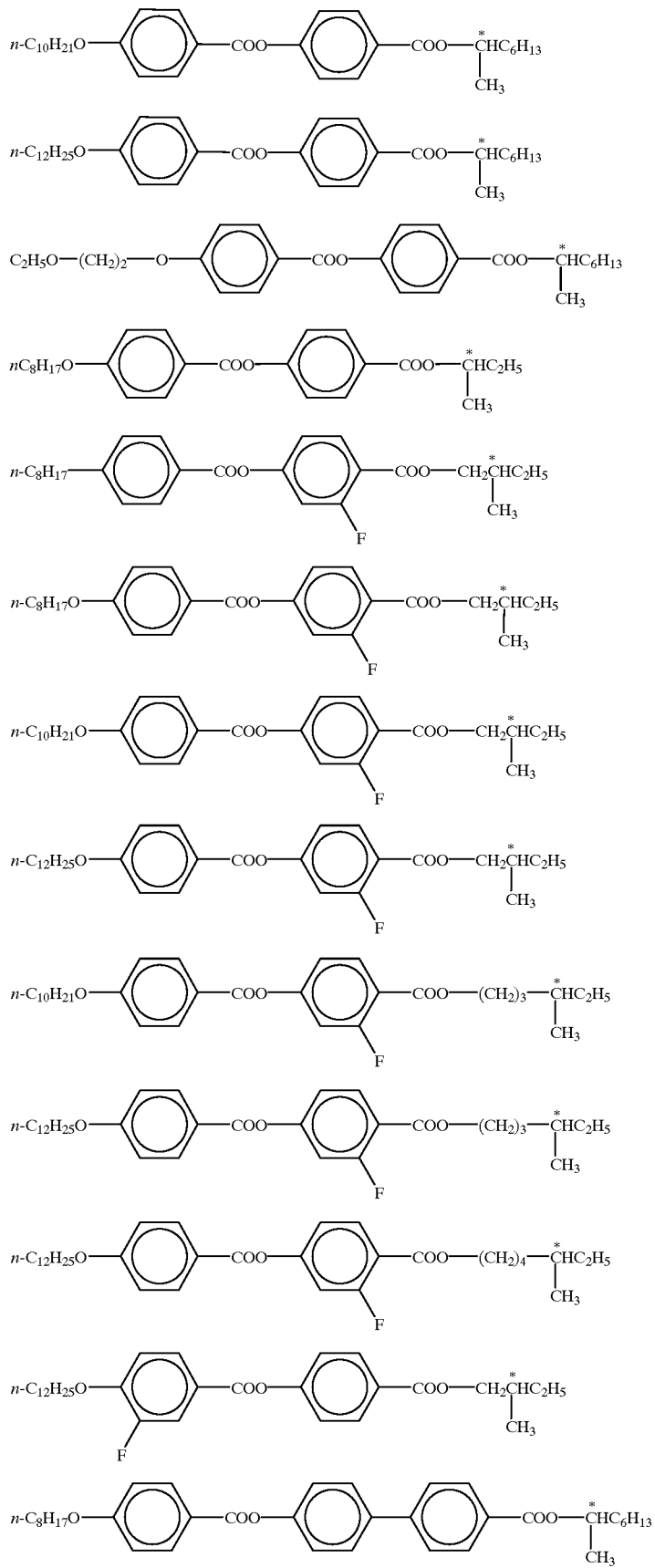

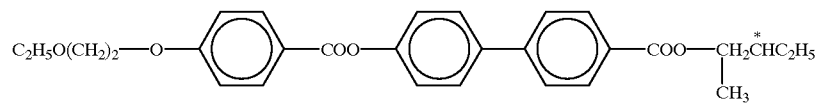
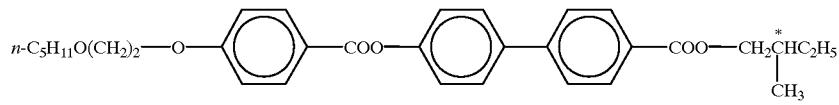
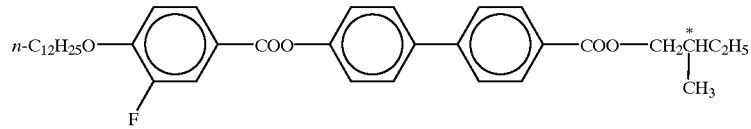
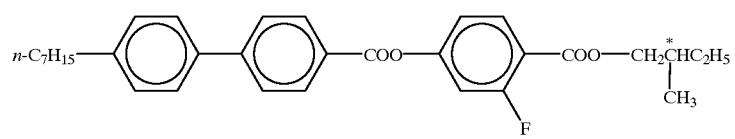
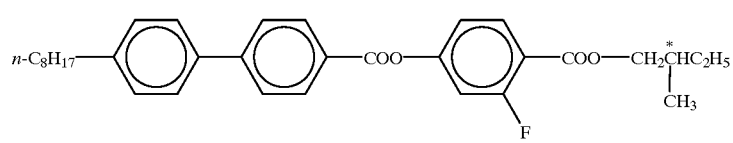
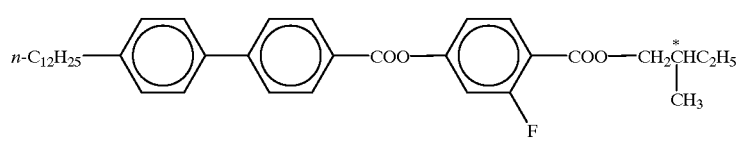
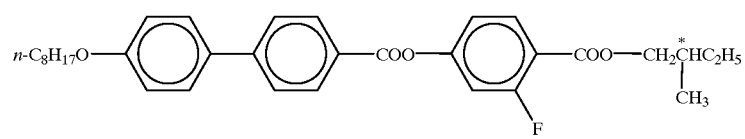
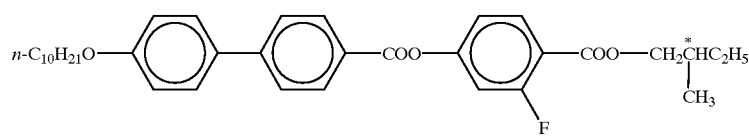
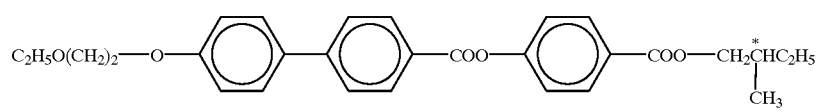
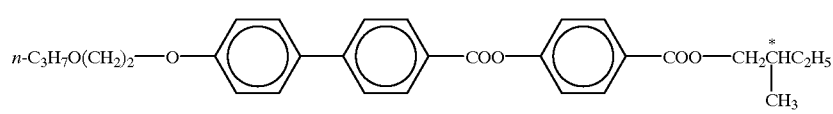
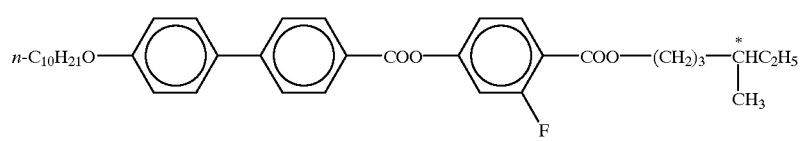
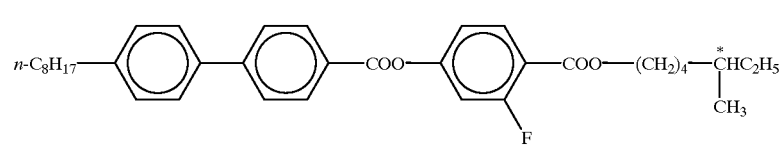

-continued
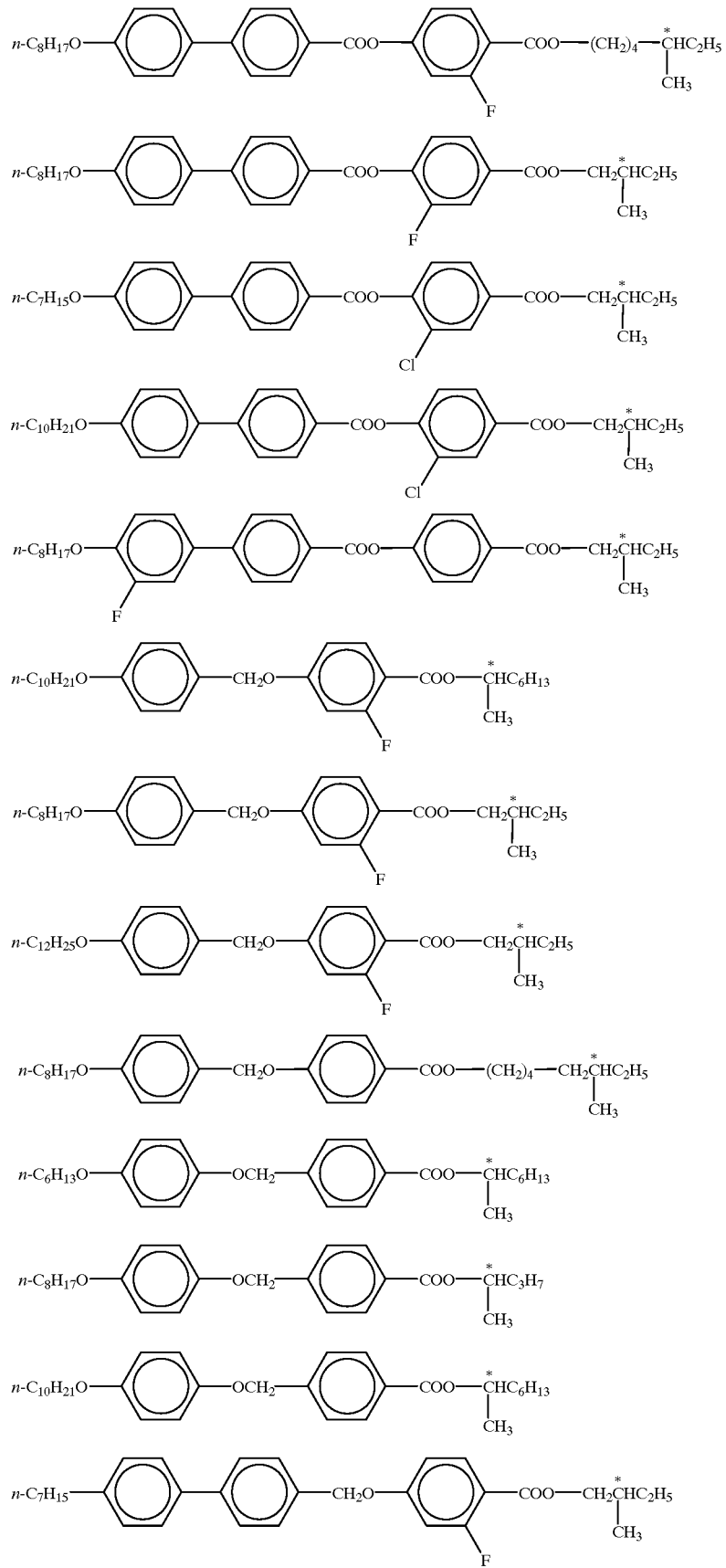

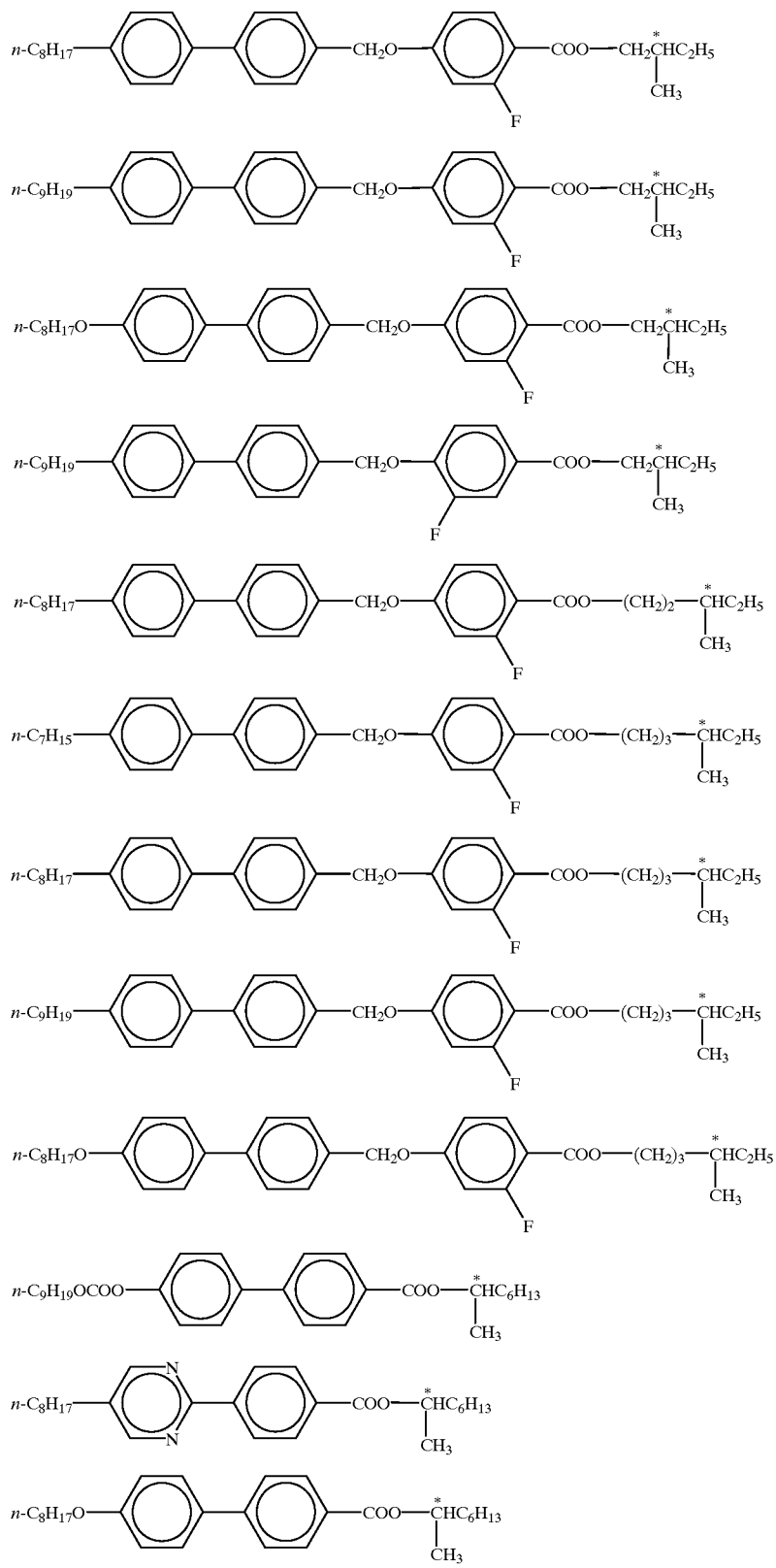
11. The liquid crystal display according to claim 2 wherein said at least one member is chiral.
* * * * *